US008933932B2

(12) United States Patent
Huysmans et al.

(10) Patent No.: US 8,933,932 B2
(45) Date of Patent: Jan. 13, 2015

(54) METHOD FOR MAPPING TUBULAR SURFACES TO A CYLINDER

(75) Inventors: Toon Huysmans, Borgerhout (BE); Jan Sijbers, Duffel (BE)

(73) Assignees: Iminds VZW, Ledeberg (BE); Universiteit Antwerpen, Antwerp (BE)

( * ) Notice: Subject to any disclaimer, the term of this patent is extended or adjusted under 35 U.S.C. 154(b) by 193 days.

(21) Appl. No.: 13/377,046

(22) PCT Filed: Jun. 7, 2010

(86) PCT No.: PCT/EP2010/057882
§ 371 (c)(1),
(2), (4) Date: Feb. 1, 2012

(87) PCT Pub. No.: WO2010/142624
PCT Pub. Date: Dec. 16, 2010

(65) Prior Publication Data
US 2012/0120074 A1  May 17, 2012

(30) Foreign Application Priority Data

Jun. 9, 2009  (EP) .................................... 09162289

(51) Int. Cl.
*G06T 17/00* (2006.01)
*G06T 15/00* (2011.01)
*G06T 17/20* (2006.01)

(52) U.S. Cl.
CPC ............... *G06T 17/20* (2013.01); *G06T 17/205* (2013.01)
USPC .......................................... 345/420; 345/419

(58) Field of Classification Search
CPC ....... G06T 17/20; G06T 17/205; G06T 15/02; G06T 17/00
USPC .................................................. 345/420, 419
See application file for complete search history.

(56) References Cited

U.S. PATENT DOCUMENTS

| 6,212,420 | B1 | 4/2001 | Wang et al. | |
| 6,831,638 | B2 * | 12/2004 | Praun et al. .................... | 345/419 |
| 7,310,101 | B2 * | 12/2007 | Wang et al. .................... | 345/582 |
| 8,405,659 | B2 * | 3/2013 | Lakshmanan et al. ......... | 345/427 |
| 8,502,815 | B2 * | 8/2013 | Stefanoski et al. ............ | 345/419 |
| 2002/0193687 | A1 | 12/2002 | Vining et al. | |
| 2005/0190179 | A1 * | 9/2005 | Hong et al. .................... | 345/419 |
| 2009/0040218 | A1 * | 2/2009 | Museth et al. ................ | 345/420 |
| 2009/0128556 | A1 * | 5/2009 | Fischer et al. ................ | 345/420 |

OTHER PUBLICATIONS

Toon Huysmans et al., Improved Shape Modeling of Tubular Objects Using Cylindrical Parameterization, 2006, (c) Springer-Verlag Berlin Heidelberg 2006, MIAR 2006, LNCS 4091, pp. 84-91.*
International Search Report for PCT/EP2010/057882, Completed by the European Patent Office on Jul. 27, 2010, 4 pages.
Huysmans et al. Journal of WSCG 2005, vol.13, p. 97-104, "Parameterization of Tubular Surface on the Cylinder."
Huysmans et al. Medical Imaging and Augemented Reality 2006, p. 84-91, "Improved Shape Modeling of Tubular Objects Using Cylindrical Parameterization."

(Continued)

*Primary Examiner* — Kee M Tung
*Assistant Examiner* — Yuehan Wang
(74) *Attorney, Agent, or Firm* — Workman Nydegger

(57) ABSTRACT

Methods of cylindrical surface parameterization, such as colon flattening are provided for parameterizing tubular surfaces onto a cylinder, wherein the length of the cylinder is modified so that parameterization distortion is reduced.

23 Claims, 14 Drawing Sheets

(56) References Cited

OTHER PUBLICATIONS

Haker et al. IEEE Transactions on Medical Imaging Jul. 2000, vol. 19, No. 7, p. 665-670, "Nondistorting Flattening Maps and the 3-D Visualization of Colon CT Images."
Mai et al. Advanced Concepts for Intelligent Vision Systems 2007, p. 607-615, "Colon Visualization Using Cylindrical Parameterization."
Haker et al. IEEE Transactions on Visualization and Computer Graphics Apr.-Jun. 2000, vol. 6, No. 2, p. 181-189, "Conformal Surface Parameterization for Texture Mapping."
Zockler et al. The Visual Computer 2000, vol. 16, p. 241-253, "Fast and intuitive generation of geometric shape transitions."
Antiga et al. IEEE Transactions on Medical Imaging Jun. 2004, vol. 23, No. 6, p. 704-713, "Robust and Objective Decomposition and Mapping of Bifurcating Vessels."
Grimm. International Journal of Shape Modeling Mar. 13, 2004, vol. 10, No. 1, 31 pages. "Parameterization using Manifolds."
Hong et al. Proceedings on the 2006 ACM, 9 pages, "Conformal Virtual Colon Flattening."
Sander et al. Proceedings on the 28th annual conference on computer graphics and interactive techniques 2001, p. 409-416, "Texture Mapping Progressive Meshes."
Hoppe. SIGGRAPH 1996, Proceedings of the 23rd annual conference on coputer graphics and interactive techniques, p. 99-108, "Progressive Meshes."
Buatois et al. Springer Lecture Notes in Computer Sciences 2007, 13 pages, "Concurrent Number Cruncher an Efficient Sparse Linear Solver on the GPU."
Pinkall et al. Experiment. Math 1993, vol. 2, Issue 1, p. 15-36, "Computing Discrete Minimal Surfaces and Their Conjugates."
Desbrun et al. Eurographics 2002, vol. 21, No. 2, 10 pages. "Intrinsic Parameterizations of Surface Meshes."
Lui et al. VLSM 2005, p. 309-319, "Solving PDEs on Manifolds with Global Conformal Parametrization."
Bolz et al. ACM Trancs. Graph. 2003, vol. 22, No. 3, p. 917-924, "Sparse Matrix Solvers on the GPU: Conjugate Gradients and Mulfigrid."

\* cited by examiner

---
Algorithm 1 Parameterize $\mathcal{M}$ with distortion measure $\xi_S$
---
Input: $\mathcal{M}$
Output: $x$
  1: build progressive mesh of $\mathcal{M}$:
     $\mathcal{M} \equiv \mathcal{M}^m \xrightarrow{ecol_m} \mathcal{M}^{m-1} \xrightarrow{ecol_{m-1}} \ldots \xrightarrow{ecol_1} \mathcal{M}^0$
  2: map base mesh $\mathcal{M}^0$ to $C_h^2$: $\mathcal{M}^0 \to \mathcal{U}^0$
  3: for $i = 1$ to $m$ do
  4:    introduce new vertex $v_i$ by applying vsplit$_i$ to $\mathcal{U}^{i-1}$:
       $\mathcal{U}^{i-1} \xrightarrow{\text{vsplit}_i} \mathcal{U}^i$
  5:    provide initial position $u_i^0$ for $v_i$
  6:    optimize position of $v_i$ on $C_h^2$, starting from $u_i^0$:
       $\hat{u}_i = \arg\min_{u_i} \xi_S(u)$
  7:    if significant increase in detail then
  8:      while improvement do $\hat{u}_j = \arg\min_{u_j} \xi_S(u)$, $\forall j$
  9:      optimize length $h$ of $C_h^2$: $h = \arg\min_h \xi_S(u)$
10:    end if
11: end for
12: return $x = u^{-1}$
---

Figure 1

METHOD FOR MAPPING TUBULAR SURFACES TO A CYLINDER

CROSS-REFERENCE TO RELATED APPLICATION

This application is the U.S. national phase of PCT Appln. No. PCT/EP2010/057882 filed Jun. 7, 2010 which claims priority to European application EP 09162289.4 filed Jun. 9, 2009, the disclosures of which are incorporated in their entirety by reference herein.

FIELD OF THE INVENTION

The present invention relates to the field of surface parameterization. More specifically, the present invention relates to the field of cylindrical surfaces, such as a colon, where the methods of the invention can be used in virtual colonoscopy.

BACKGROUND OF THE INVENTION

Computed Tomography Colonography (CTC) or Virtual Colonoscopy (VC) is a minimally-invasive alternative to conventional optical colonoscopy to detect polyps of the colon wall. CTC has significantly evolved since then and is now emerging as a possible screening technique for colorectal cancer. The CTC technique combines computer tomography of the abdomen with specialized visualization techniques in order to provide the physician with 2D and 3D views of the colon targeting a complete coverage of the colon wall. Traditionally, 2D axial images synchronised with 3D rendered fly-through navigation of the colon is used for virtual inspection. The length of the colon and its convoluted nature, however, make such an inspection process tedious and error-prone. Moreover, a polyp, hidden behind a fold, can easily be missed with this approach.

Virtual colon flattening or virtual colon dissection is a recently emerging visualization technique for colon inspection. The virtual flattening is achieved by unfolding the entire surface of the colon to the 2D plane and imposing from the centreline-view lighting on the unfolded colon. The resulting view resembles pathological preparation or dissection of the colon, hence the name virtual colon dissection.

A popular approach to generate an unfolded view of the colon starts by uniformly sampling the centreline of the colon. This is followed by computation of a cross section at each centreline point using ray casting. Then, the unfolded view is obtained by unfolding and concatenating the obtained cross sections. Examples are described in U.S. Pat. No. 6,212,420 and US2002/193687. The main disadvantage of such a technique is that, in high curvature regions of the centreline, polyps may be missed or single polyps may occur multiple times. This happens because, at high curvature regions, the distance between neighbouring cross sections can become too large or intersections of neighbouring cross sections occur. Although several approaches have been introduced to overcome these problems, these approaches can introduce large distortions.

Colon flattening through surface parameterization is a technique that directly generates a guaranteed one-to-one flattening of the whole colon surface. In this way, polyps are never repeated or missed. However, known parameterization techniques either preserve angles or areas in the flattening process, and not both angles and areas. Angle preservation preserves local shape but it can result in significant down-scaling of a polyp in the flattened representation which, in turn, can result in overlooking of the polyp during inspection (Haker et al., IEEE Trans Med Imaging 19(7) (2000b) 665-670). The increased distortion resulting from strict area preservation, on the other hand, may also lead to difficulties in the detection of polyps.

Surface parameterization is a technique to convert a mesh, described using primitives like triangles, quadrilaterals, or polygons, into a parametric description of the surface. In most applications the surface is two-dimensional and it is embedded in a three dimensional space. Thus, a parameterization is a map from a two-parameter domain onto the three-coordinate surface.

Most research on surface parameterization has focused on planar and spherical parameterization because many real world surfaces are either of disc-like or spherical topology. Surfaces of other topologies are handled by dividing the surface in charts of disc-like topology and subsequently parameterizing these charts to the plane. The choice of the parameterization domain is imposed by the topology of the surface that needs parameterization. Since the parameterization should be a continuous map, the parameterization domain and the surface should be topologically equivalent. A class of surfaces that is much less covered but also widely encountered are surfaces of cylindrical topology.

Cylindrical parameterization constructs a map from a surface of cylindrical topology to the cylinder. The few methods that already exist to construct such maps, usually alter the topology of the surface prior to parameterization and often fail in keeping distortions within acceptable bounds. Some rely on a two step procedure involving cutting of the surface which may result in a suboptimum (see the Haker paper).

There has been little research in parameterization of surfaces of cylindrical topology (e.g. the above-mentioned Haker paper), although lots of surfaces of this kind are encountered in the real world: blood vessels, the trachea, the colon, cochlear canals, etc. Cylindrical parameterization can even be used for certain elongated spherical surfaces after topological modification.

Surface parameterization is a very useful technique. It is used in computer graphics for detail mapping, remeshing and level of detail construction, rendering acceleration and also morphing and detail transfer between surfaces. A parameterization is also very useful for describing surfaces using basis functions, which has applications in surface fitting, description and compression. In medical imaging, parameterizations are useful for easing the visualization of complex structures and they also allow the construction of surface correspondences which make statistical shape analyses and model based image segmentation possible. Applications of specific interest for cylindrical parameterization are segmentation and analysis of tubular structures, e.g. automatic shape guided segmentation of human trachea and non-invasive stent shape prediction for surgical intervention in tracheal stenosis. It has also been employed for mapping, segmentation and centreline calculation of possibly bifurcating blood vessels. Furthermore, cylindrical parameterization can be used for virtual flattening of the colon in virtual colonoscopy and prone-supine scan colon registration is also envisioned.

Linear parameterization methods, such as proposed by Haker et al. (IEEE Transactions on Visualization and Computer Graphics 6 (2) (2000a) 181-189, ISSN 1077-2626), are popular since they are very fast and generate parameterizations with low (angle) distortion in case the surfaces are well-behaved. Usually, the parameterization is obtained by solving the Laplace equation on the surface for both parameter coordinates while enforcing certain boundary constraints. Depending on the actual discretisation of the Laplace operator, different realisations of the system matrix are possible. Among the most celebrated are cotangent weighting, resulting in a harmonic map, and mean value weighting. Often, the boundary mapping of the parameterization is defined beforehand which thus results in a boundary value problem. Free boundary parameterizations, where the boundary of the parameterization is allowed to move freely together with the interior, are achieved using natural boundary conditions.

For cylindrical parameterization, a number of approaches have been proposed in the past:

Haker et al. (2000a) solve two boundary value problems in order to obtain a conformal parameterization of the surface. First, the axial parameterization is obtained. Then, the surface is dissected into a topological disc and a conjugate angular parameterization is derived.

Zöckler et al. (The Visual Computer 16 (5) (2000) 241-253) parameterized the cylindrical surface in two stages: first the surface is cut and parameterized onto the plane, and then the parameterization is glued back together and optimized on the cylinder. Since the surface is cut, distortions are introduced in the first optimization. Therefore the parameterization needs to be optimized a second time. For complex surfaces this method might not find the optimal parameterization.

The method of Antiga and Steinman (Medical Imaging, IEEE Transactions on 23 (6) (2004) 704-713, ISSN 0278-0062) maps segments of blood vessels to the cylinder by first mapping the axial coordinate using a harmonic function, similar to Haker et al. (2000b), and then mapping the angular coordinate using a heuristic method. Although this approach provides nice results for vessels, it can only be applied to surfaces of cylindrical topology with star shaped cross sections.

Grimm (International Journal of Shape Modeling 10 (1) (2004) 51-80) proposes a method to map surfaces to certain manifolds. For the cylinder manifold, the surface is first divided into a number of charts, which are then parameterized separately and stitched together. The parameterization is then relaxed along the chart boundaries to remove the high distortion. Unfortunately, this relaxation is only local and, therefore, the resulting parameterization can be suboptimal with respect to the distortion metric.

In Hong et al. (Proceedings of the 2006 ACM symposium on Solid and physical modeling, ACM, Cardiff, Wales, United Kingdom, ISBN 1-59593-358-1, 85-93, 2006), a parameterization of the colon is obtained using holomorphic one-forms on a dual covering of the colon surface. They obtain similar results as our linear method but at the expense of duplicating surface geometry for the double covering. Furthermore, positional landmark constraints can only be satisfied using a second optimization, as opposed to our method, where they can be directly incorporated.

Consequently, there is a need for improved techniques for surface parameterization, more particularly cylindrical surface parameterization, that minimize and balance both angle and area distortion.

The paper "*Parameterisation of Tubular Surfaces on the cylinder*" (T. Huysmans et al., Journal of WSCG 2005, vol. 13, January 2005, pp. 97-104) discloses a method to parameterize tubular surfaces on a cylinder. However, as recognised by the authors on p. 102, the proposed solution wherein the length of the cylindrical domain has to be estimated by the user of the method.

Hence, there is also a need for an approach wherein this length is determined automatically.

SUMMARY OF THE INVENTION

The present invention relates to the parameterization of surfaces of cylindrical topology to a cylinder of optimal length h, whereby this length is determined in an automatic way. In a first aspect of the invention this is achieved by applying a non-linear method wherein from the tubular surface to be parameterised a progressive mesh is built and the mesh is mapped onto the cylinder of a given, initial length. The method then gradually refines the parameterisation, during which step the cylinder length is so modified so that the distortion level is reduced. More details are provided below. In a second aspect the automatic determination of the cylinder length is obtained by a linear method, wherein a path is determined between two boundaries of the tubular surface. The path is subsequently used to provide a map (constructed as a harmonic function) between the tubular surface and the cylinder of a given, initial length. Next, conformality is enforced at the boundaries of the tubular surface, whereby the cylinder length is so adapted that the distortion due to the parameterisation is optimised. Also on this method more details are given below.

The present invention is related to methods for parameterizing tubular surfaces onto a cylinder. The cylinder can be seen as the natural parameterization domain for tubular surfaces since they share the same topology. Most state of the art algorithms are designed to parameterize disc-like surfaces onto the plane. Surfaces with a different topology are cut into disc-like patches and the patches are parameterized separately. This introduces discontinuities and constrains the parameterization. Also the semantics of the surface are lost. The method according to the present invention avoids this by parameterizing tubular surfaces on their natural domain the cylinder. Since the cylinder is locally isometric to the plane, calculations can be done on the cylinder without losing efficiency. For speeding up the calculation a progressive parameterization technique is used. Together, this results in a robust, efficient, continuous, and semantics preserving parameterization method for arbitrary tubular surfaces.

An important application of the present invention more specifically relates to colon flattening. Colon flattening through surface parameterization is a technique that directly generates a guaranteed one-to-one flattening of the whole colon surface. In this way, polyps are never repeated or missed. Unlike known parameterization techniques, the methods of the present invention optimally preserve angles and areas in the flattening process.

The non-linear method of the invention succeeds in generating parameterizations with low angle and area distortion, even for very convoluted surfaces, at the cost of a longer execution time. In contrast to prior art methods, the non-linear method is not subject to the constraints of prior surface chartifications and directly optimizes the distortion on the cylinder.

The present invention has the following specific advantages:

(a) Non-linear parameterization methods, in comparison with linear methods, are computationally more complex but they produce maps with much more balanced angle and area distortion, especially for surfaces that require large deformations in order to be parameterized. The non-linear parameterization approach for surfaces of cylindrical topology is the only cylindrical parameterization method to date that allows direct optimization of a balanced distortion measure, e.g. stretch.

In one embodiment the present invention provides a non-linear parameterization method for surfaces of cylindrical topology, said method comprising a direct optimization of a balanced angle and area distortion measure.

The optimality of the balanced distortion in areas and angles is enforced by optimizing newly introduced vertices inside their neighbourhood with respect to the distortion criterion; once in a while, when the amount of vertices has significantly increased, repeatedly optimizing all vertices, one by one, in their neighbourhoods with respect to the distortion criterion, and once in a while, when the amount of vertices has significantly increased, optimizing the length h of the cylindrical domain with respect to the distortion criterion.

(b) The non-linear and linear cylindrical parameterization methods of the present invention take the periodicity of the angular parameter of the cylindrical domain directly into account. In most previous methods this periodicity was removed by cutting the surface open prior to parameterization. This, however, over-constrains the parameterization and may introduce unwanted distortions. Since the methods in this invention do not use such a cutting strategy, these distortions are certainly avoided.

In one embodiment the present invention provides a parameterization method for surfaces of cylindrical topology, wherein the periodicity of the angular parameter is directly taken into account.

For the linear method the periodicity is taken into account by the introduction of a parameter seam on the surface, i.e. a path between both boundaries along which the parameter jump will occur. During the construction of the matrices for the KKT matrix, the parametric length of edges that cross the parameter seam is decreased by $2\pi$ in the angular parameter. In this way, the periodicity of the angular parameter is taken into account in the measurement of the lengths of the edges and all derived quantities, e.g. the Laplacian.

For the non-linear method the periodicity is taken into account during each vertex position optimization. The neighbourhood of a vertex, i.e its set of neighbouring triangles, is locally mapped to the plane and parameterized relative to one of its neighbours. Then the optimization is carried out in the plane and the result is mapped back to the cylinder. In this way, the periodicity problem is avoided without constraining the optimization.

(c) Most previously reported cylindrical parameterization methods do not give an estimate of the optimal length of the parameterization cylinder. Instead the length of the domain is fixed and needs to be determined beforehand. In such cases it is usually taken to be unit length. As a consequence, for elongated surfaces the resulting parameterizations are highly distorted. Both non-linear and linear methods in the present invention automatically determine the optimal length of the parameterization cylinder with respect to their distortion measure as part of the optimization. The resulting parameterization is therefore of minimal distortion over all possible lengths of the cylinder.

In one embodiment the present invention provides a parameterization method for surfaces of cylindrical topology, further comprising an automatic determination of the optimal length of the parameterization cylinder with respect to the distortion measure as part of the optimization.

In the non-linear method the length of the cylindrical domain is found directly by optimization with respect to the distortion metric. The optimization is carried out each time the number of vertices has increased significantly.

For the linear method the optimal length is found by enforcing the conformality constraints and constraining the boundary vertices to a straight line/circle on the cylinder. The length is found, together with all the vertex positions, by solving the KKT system and it is optimal in terms of angular distortion.

(d) The conformal (linear) cylindrical parameterization as a constrained optimization problem allows seamless integration of extra constraints. This allows direct construction of parameterizations with consistent landmark mapping which is useful in surface correspondence construction. This is not possible with previous parameterization methods for the cylinder.

In an embodiment the present invention provides a linear parameterization method allowing seamless integration of extra constraints in a constrained optimization problem.

The constraints that fix certain surface points to predefined parameter locations can be formulated in matrix terms, similar to the conformality constraints or the straight boundary constraints that are already present, and these constraints can be combined with the other constraints into the KKT system.

In a first aspect the present invention provides a method for determining a parametric representation of a tubular surface onto a cylinder, comprising the steps of:
building a progressive mesh from the tubular surface,
mapping the mesh onto the cylinder of a given length, thereby obtaining a parameterisation with an amount of initial distortion,
gradually refining said parameterisation, whereby iteratively additional vertices are introduced to the cylinder by splitting vertices on the mesh and their position is optimized with respect to the distortion measure, said length of the cylinder being so modified in the optimizing that the initial distortion is reduced.

The distortion typically comprises both angle and area distortion. The distortion is preferably determined with a distortion measure that balances the angle and area distortion.

In one embodiment the progressive mesh is built by successively collapsing edges of the mesh into vertices, using a measure penalizing deviation from the tubular surface. An edge collapse is subject to at least the following constraints: an edge collapse should not result in: (a) a non-manifold geometry; (b) degenerate triangles; (c) triangles that have all three vertices at the same boundary; and (d) boundary vertices should only be collapsed into vertices of the same boundary.

The mesh is mapped onto the cylinder when the mesh contains six vertices (i.e. three at each boundary) or more. In an advantageous embodiment the mapping is performed by evenly distributing the vertices of the mesh over the boundaries of the cylinder.

In one embodiment the initial position of a new vertex is chosen at the centre of the kernel of its 1-ring neighbourhood on the cylinder. In another embodiment the position of said vertex is further optimized, with respect to the distortion measure, using gradient descent within the bounds of the kernel. In a specific embodiment a full optimization is run occasionally wherein vertices (possibly all) are optimized, one by one, within the kernel of their 1-ring neighbourhood, until the improvement in distortion drops below a predefined value. The order in which each vertex is optimized is determined by the distortion reduction that vertex caused in the previous optimization.

In a specific embodiment the length of the cylinder is optimized using Brent's 1D minimization method after each full run of vertex optimizations. Further, Jacobians of the parameterizations may be used to optimize the length and the current Jacobian for each triangle is stored during the full vertex optimization.

In another embodiment the present invention provides the method for parameterizing a tubular surface onto a cylinder as described above, further comprising at least one linear parameterization step. The non-linear parameterization method reducing angle and area distortion optimally can then be preceded by a fast linear surface parameterization. This linear method generates high quality parameterizations very efficiently. Both the linear and the non-linear approach automatically determine the optimal length of the parameterization domain, resulting in parameterizations with the least possible distortion. For surfaces with large variation in cross-sectional diameter, the linear approach as such suffers from increased area distortion. For well-behaved surfaces the linear method steps can be performed on their own.

In a second aspect the invention relates to a method for parameterizing a tubular surface onto a cylinder, comprising the steps of:
- determining a path between the two boundaries of the tubular surface,
- providing a map between the tubular surface and the cylinder of a given length using the path, said map being constructed as a harmonic function,
- enforcing conformality at the boundary of the tubular surface, whereby the length of the cylinder is so adapted that the distortion introduced by the parameterisation is optimized.

The linear parameterization is thus provided by constructing a conformal map as a harmonic function minimizing the Dirichlet energy, whereby a more optimal length of the cylinder is obtained by enforcing conformality at the boundary.

In a specific embodiment of the present invention there is provided a method for parameterizing a tubular surface onto a cylinder, comprising the steps of: a) parameterizing using a linear parameterisation step as described above; b) calculating the best position of each vertex within its 1-ring by a non-linear optimalisation of the balanced distortion measure as previously described; c) solving a linear problem using the resulting local optimal positions in a matrix, minimizing the energy needed to position said vertices within their 1-ring as determined in step b; and d) repeating the steps from step b until a (predefined) stop criterion is met, e.g. until the parameterization does not change anymore or the change remains under a given threshold level.

The methods of the invention further provide steps for flattening said cylinder onto a rectangle by cutting said cylinder open.

The methods of the present invention are specifically suited for colon flattening, whereby the tubular surface is a colon.

In a further aspect the invention relates to a program, executable on a programmable device containing instructions, which when executed, perform the method for parameterizing a tubular surface onto a cylinder as described above.

In a further aspect the invention relates to a computer system arranged for performing the method as previously described.

BRIEF DESCRIPTION OF FIGURES

FIG. 1: Algorithm of non-linear parameterization method.

DETAILED DESCRIPTION OF THE INVENTION

Figure 2:
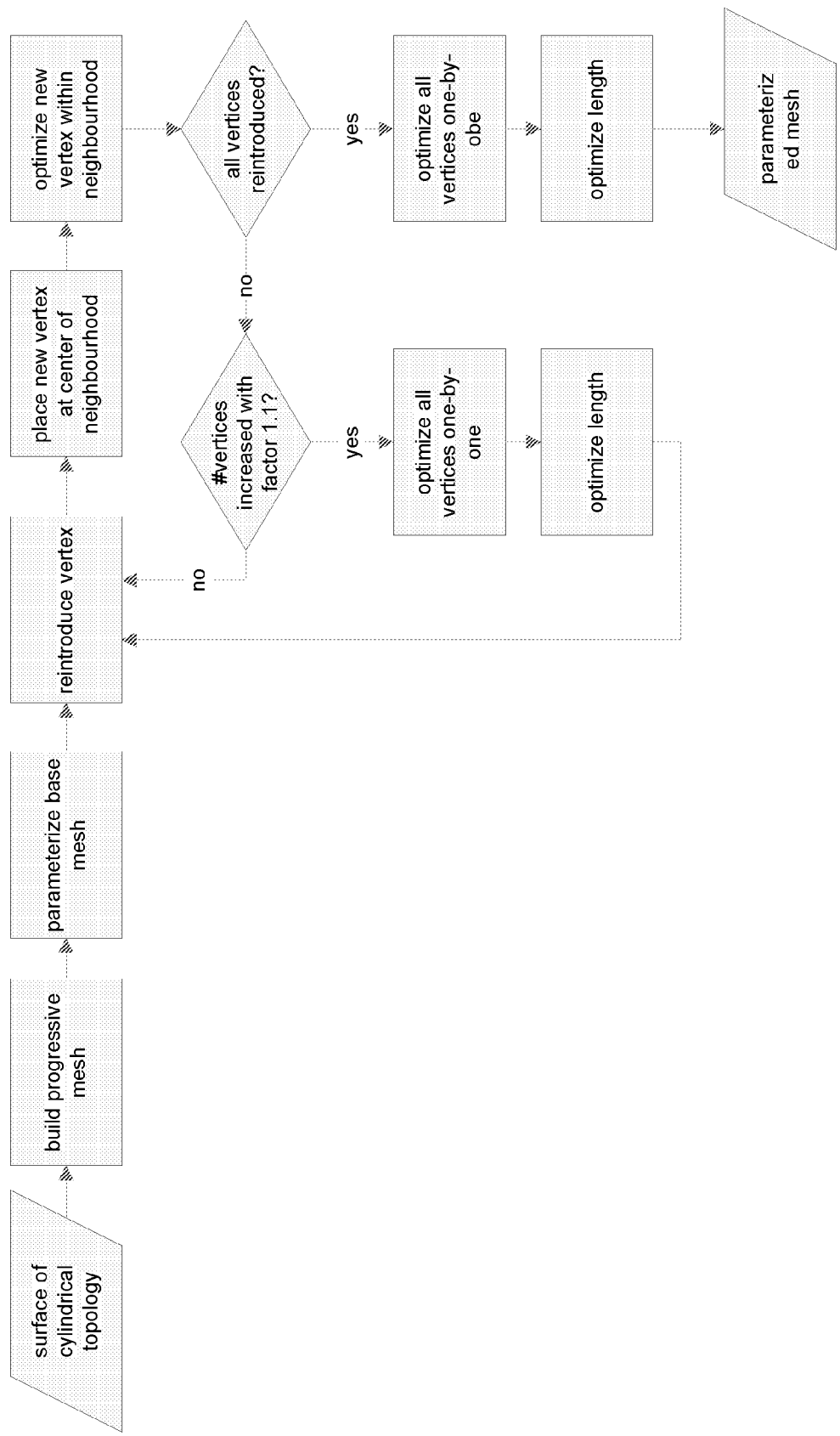
FIG. 2: Flowchart of non-linear parameterization method.

Parameterization of a surface is the task of defining a map between the surface and a specific parameter domain. Such a map equips each point of the surface with a coordinate in the space of the parameter domain, thereby introducing a deformation.

A useful parameterization should have several properties: it should be a continuous one-to-one map and it should keep the introduced deformation to a minimum. The deformation, or metric distortion, can be measured in terms of local changes in area and angles. Usually, a balanced trade-off between these two is pursued.

Parameterization of tubular surfaces requires finding a one-to-one mapping from the surface of the cylinder to an arbitrary tubular surface. With tubular surface is meant any elastic deformation of a sphere with two holes or boundaries. The upper boundary of the cylinder should map to one of the boundaries of the tubular surface and the lower boundary of the cylinder should map to the other boundary of the tubular surface. The interior of the surface of the cylinder then has to be mapped to the interior of the tubular surface.

There are an infinite number of maps possible between the cylinder and a tubular surface, but desired is a map that is a balanced trade-off between the following two properties. First, this requires that the semantics of the cylinder are ported to the tubular surface. By this is meant that axial lines on the cylinder are mapped to lines that run in the axial direction on the tubular surface and that radial curves of the cylinder are mapped to curves that run in the radial direction on the tubular surface. Second, this also involves that a uniform distribution of points on the cylinder is mapped to a quasi uniform distribution of points on the tubular surface. Minimizing a balanced trade-off between angle and area distortions, like the stretch measure, of the map will produce a map with a balanced trade-off between the semantics and the uniformity property.

The next section explains the methods of the present invention in the approach to the parameterization of tubular surfaces on the cylinder.

The present invention relates in one embodiment to a flattening technique that strives to balance angular and areal distortions by minimizing the metric distortion, also referred to as stretch. In this way, down-scaling of polyps in the flattened representation is avoided while the local shape is preserved as much as possible. This leads to significantly improved visibility of certain classes of polyps.

The flattening is realized in two steps: a cylindrical parameterization is calculated for the colon together with the optimal length of the cylindrical domain. This is followed by dissection of the surface and transformation to a rectangle in the plane. The obtained planar colon representation is equipped with appropriate normals that, in combination with parallel projection rendering, result in a centreline point-of-view shading.

The present invention provides two methods that do not rely on prior cutting of the cylindrical surface: a fast linear method for surfaces with small cross-sectional diameter variance and a computationally more complex non-linear method that can be used for arbitrary surfaces. Moreover, and in contrast with prior methods, both methods presented automatically determine the optimal length of the cylindrical parameter domain.

The cylindrical parameterization methods of the present invention take the periodicity of the angular parameter of the cylindrical domain directly into account. In previous methods, this periodicity was removed by cutting the surface open prior to parameterization. This over-constrained the parameterization and introduced unwanted distortions.

The non-linear optimization succeeds in generating low distortion parameterizations, even for very deformed surfaces. It constructs the parameterization in a hierarchical way to make it efficient and robust. The non-linear cylindrical parameterization method allows direct optimization of the distortion measure.

For more well-behaved surfaces, the use of the linear method is advised. It is a very fast method since it is based on the solution of a linear system and it provides quality parameterizations comparable to those from the non-linear method for these well-behaved surfaces.

Both proposed methods also automatically determine the optimal length of the cylindrical parameterization domain as part of the optimization, this in order to generate a parameterization with minimal distortion over all possible lengths of the cylinder.

In one embodiment the present invention provides a method for cylindrical parameterization comprising an initial fast linear optimization step followed by a precise non-linear step for minimizing the distortion measure.

Cylindrical Parameterization

A surface has cylindrical topology if it can be continuously deformed, without tearing or gluing, to an open ended cylinder. More formally, only orientable manifolds M with two boundaries and without handles are considered. The parameterization domain is the two-dimensional open-ended right circular cylinder with unit radius and length h, denoted by $C^2_h$. It also has two boundaries. The parameterization domain itself is parameterized by an angular coordinate $u^{(0)}$ in $[0,2\pi)$ and an axial coordinate $u^{(1)}$ in $[0, h]$.

A cylindrical parameterization of M is any homeomorphic map x from cylinder $C^2_h$ to the surface M. For x to be a homeomorphism, it must be a bijective, continuous function, and have a continuous inverse. If the topology of M is consistent, such a homeomorphism can always be obtained although a solution is not unique. This can be seen from the fact that the composition of any automorphism of the cylinder with the parameterization x of the surface M, is a different parameterization of the same surface. The particular solution that a parameterization technique will propose is usually the result of the minimization of a certain energy functional. Different functionals result in different parameterizations.

The map x is represented by embedding the connectivity graph of the surface M in the parameterization domain $C^2_h$. Suppose the surface M is described by the pair (K, M) where K is the simplicial complex containing the vertices, edges and faces of the surface mesh and $M=(x_0, \ldots, x_{n-1})$ are the coordinates of the vertices of the surface in $R^3$. Then, the parameterization x is represented by the embedding U=(K, U), where $U=(u_0, \ldots, u_{n-1})$ are the coordinates of the vertices of the mesh on the cylinder $C^2_h$. When an embedding is established, the parameterization is defined at the vertices as $x(u_i)=x_i$ and extended to the triangles by interpolation: a point p in a parametric triangle $u_iu_ju_k$ with barycentric coordinates $(b_i, b_j, b_k)$ is mapped to $x(p)=x(b_iu_i+b_ju_j+b_ku_k)=b_ix_i+b_jx_j+b_kx_k$. Note that the inverse of the piecewise linear map x exists and that it will be denoted by u.

In the methods of the present invention, a linear and a non-linear parameterization method are proposed, as already mentioned. Both methods find a parameterization for a surface M by constructing the cylindrical embedding U or, equivalently, the map u. The actual parameterization may then be obtained as the inverse of this map, i.e. $x=u^{-1}$. A combined method of both linear and non-linear parameterization is also proposed.

A. Non-Linear Parameterization Method

In a first aspect the present invention provides a non-linear parameterization method for cylindrical surfaces.

Prior parameterization methods are computed in the following two steps: first, find a geodesic triangulation of the cylinder using the connectivity of the tubular surface so that a homeomorphism is obtained. Second, optimize the positions of the vertices on the cylinder so that the distortion of the parameterization is minimized. Although such method is correct, it has the disadvantage that the optimization step is very hard and that it will probably get stuck in a bad local minimum. The non-linear method of the present invention constructs the parameterization in a hierarchical way. The hierarchical parameterization utilizes the progressive mesh of the tubular surface and proceeds as follows: first the base mesh is parameterized and then the vertices are iteratively split and their placement is optimized with respect to a distortion measure.

The distortion measure penalizes angle and area deformations in a balanced way. As such, the non-linear method enables the parameterization of geometrically complex cylindrical surfaces while keeping the distortion, in both angles and areas, to a minimum.

Distortion Measure

In one embodiment the distortion measure of Sander et al., (SIGGRAPH '01: Proceedings of the 28th annual conference on Computer graphics and interactive techniques, ACM Press, New York, N.Y., USA, ISBN 1-58113-374-X, 409-416, 2001) is used. It penalizes undersampling or, equivalently, compression of triangles. In the present invention, a measure is sought after that penalizes both compression and expansion. Such a measure is obtained by making Sander's measure symmetric. The distortion is measured per triangle and the total distortion is obtained by cumulating the distortions of all the triangles. The obtained measure has a minimum of 1 when there is no distortion and approaches infinity when triangles become degenerate. For a single triangle, the distortion is measured using the singular values s1 and s2 of the Jacobian of the affine map defined by the parameterization for that triangle. These singular values, together with the singular vectors, give the direction and amount of the maximal and minimal distortion for the triangle. Sander et al. (2001) use the L2-norm of the singular values as a distortion measure and thereby penalize undersampling. In this invention we use the average of the L2-norm of the singular values and the L2-norm of the inverse of the singular values and in that way both undersampling and oversampling are penalized. The angle distortion of is measured as s1/s2. The area distortion is measured as s1*s2.

The total distortion $\xi S_{(u)}$ introduced by a parameterization u: $C^2_h \to M$ can be evaluated as:

$$\xi_S(u) = \frac{\sqrt{2}}{4A_M} \sum_{i \in K} A_i \left( \sqrt{\gamma_i^2 + \Gamma_i^2} + \sqrt{\frac{1}{\gamma_i^2} + \frac{1}{\Gamma_i^2}} \right).$$

It should be noted that this measure is not invariant under scaling of the surface M. This can be remedied easily by scaling the singular values with a factor $$\sqrt{\frac{A_{C_h^2}}{A_M}},$$

where $A_{C_h^2}$ is the area of the cylindrical domain $C^2_h$

Algorithm

The non-linear method of the present invention is outlined in the algorithm of FIG. 1. The steps of the algorithm are further explained in the flowchart of FIG. 2 and in the following sections.

Figure 3:
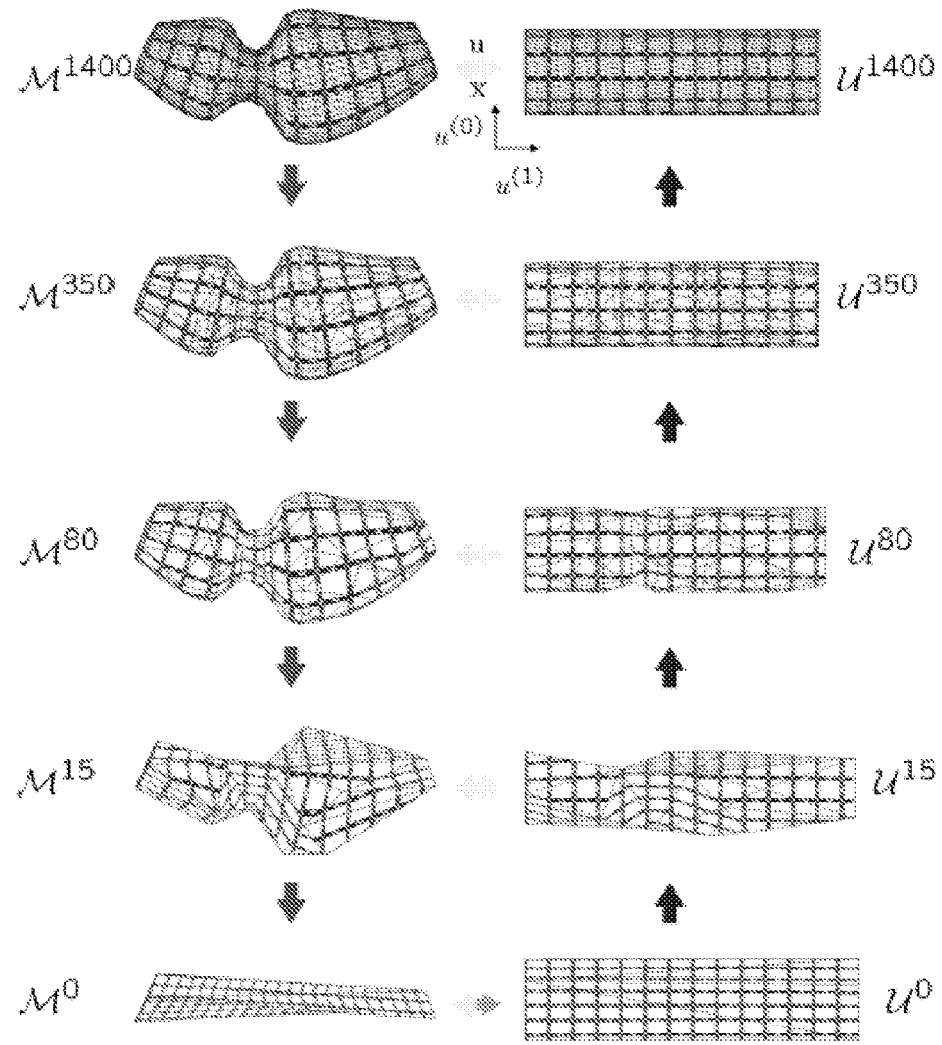
FIG. 3: A depiction of the parameterization process for a sample surface using the non-linear method.

For a visualization of the major steps of this algorithm, the reader is referred to FIG. 3, which is a depiction of the parameterization process for a sample surface using the non-linear method. The algorithm starts with the original surface $M = M^{1400}$, shown at the top left. A surface hierarchy is constructed by successively applying edge collapses. On the bottom left, the lowest surface in the hierarchy is shown, denoted $M^0$. Its embedding $U^0$ on the cylinder is trivial and it is shown at the bottom right. Now, the inverse operations of the edge collapses, namely vertex splits, are applied to the embedding and the vertex positions are optimized with respect to the distortion measure. This results in progressively finer embeddings. The final embedding $U^{1400} = U$, shown at the top right, together with the original surface $M = M^{1400}$ define the final parameterization. At each level, the iso-parametric lines of the cylinder are shown on both the embedding and the surface in order to reveal the current mapping.

Finding an embedding U of K on the cylinder $C^2_h$ for a given surface M that minimizes the non-linear distortion measure is a large and challenging optimization problem.

Progressive Mesh Construction

The algorithm starts in step 1 by constructing a surface hierarchy called the progressive mesh. The progressive mesh is represented by the base mesh $M^0$ and a set of vertex splits $\{vsplit_1, vsplit_2, \ldots, vsplit_m\}$, which are the reverse operations of the edge collapses ($ecol_i$) in reversed order.

The progressive mesh (Hoppe et al., SIGGRAPH '96: Proceedings of the 23$^{rd}$ annual conference on Computer graphics and interactive techniques, New York, N.Y., USA, ACM Press (1996) 99-108) of an original surface M is constructed using a quadratic error metric. A progressive mesh is constructed by successively collapsing edges ($ecol_i$) of the mesh into vertices. With every surface $M^i$ in the hierarchy corresponds a simplicial mesh.

The quadratic error metric quantifies the amount of deviation of the original surface introduced by a given edge collapse. By collapsing the edges that introduce low error first, a hierarchy is obtained in which the shape is preserved as much as possible. This has the advantage that the parameterization of a certain level in the hierarchy is a good initialization for the higher levels in the hierarchy.

At each vertex, the quadratic measure is defined as the sum of squared distances from a point to the planes of the triangles that intersect at that vertex. The error introduced by collapsing the vertex into one of its neighbours is measured by evaluating the quadratic metric with at position of the neighbouring vertex. A progressive mesh is constructed by successively collapsing vertices into one of its neighbouring vertices and the order in which to collapse is determined by the error metric, i.e. vertices that introduce small error are removed first.

The order of the edge collapses is determined so that the introduced quadratic error metric, which penalizes deviation from the original surface, is minimal. Furthermore, an edge collapse is subject to a number of constraints: an edge collapse should not result in:

(1) non-manifold geometry. Both boundaries of the tubular surface should have at least three vertices.

(2) degenerate triangles. Collapse a boundary vertex only into a vertex of the same boundary. This avoids that a vertex of one boundary is collapsed into a vertex of the other boundary, which would generate a degenerate mesh. This way an internal vertex can never be split into a boundary vertex.

(3) triangles that have all three vertices at the same boundary, since the parameterization of such a triangle would result in a triangle of zero area, which is undesirable.

Also, (4) boundary vertices should only be collapsed into vertices of the same boundary. Any violation of these conditions will result in an invalid parameterization.

Figure 4:
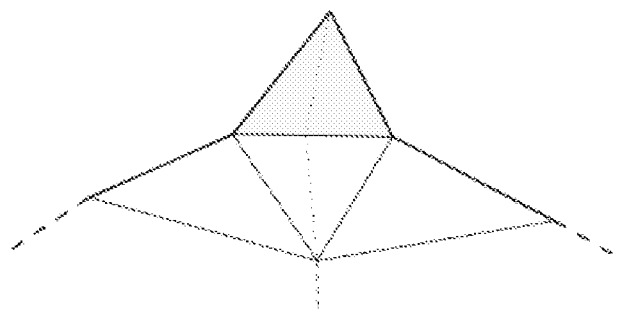
FIG. 4: Shaded triangle violating the third constraint.

It is also required that the original surface does not violate any of the above constraints. If the first or the second constraint is violated in the original surface, then the mesh is rejected. When the third constraint is violated in the original surface, the edge of the triangle that is not on the boundary is split, as depicted in FIG. 4. The shaded triangle is violating the third constraint because its three vertices are on one boundary (bold line). This is remedied by splitting the edge that is not on the boundary, this results in two extra triangles. The method further allows seamless integration of additional constraints.

Base Mesh Parameterization

Figure 5:
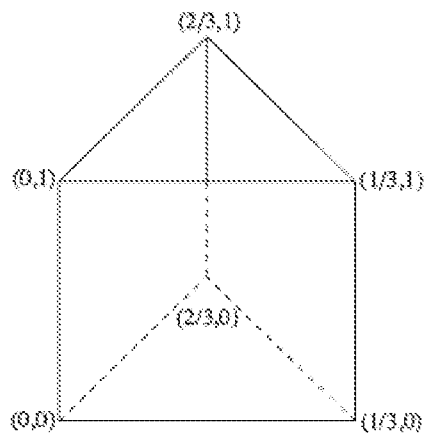
FIG. 5: Base mesh of the progressive mesh for a tubular object.

The algorithm continues in step 2 with the base mesh. It turns out, that for surfaces of cylindrical topology, the base mesh $M_0$, as generated by a progressive mesh that takes into account conditions (1)-(4), contains six vertices, namely three at each boundary. When constructing the progressive mesh of a tubular surface, the base mesh $M^0$ will be an open prism with a triangle as its base. The base mesh of the progressive mesh for a tubular object is depicted in FIG. 5, together with the $(u^{(0)}, u^{(1)})$-coordinates of its parameterization.

Each of the three square sides of the base mesh consists of two triangles. This mesh is parameterized on the cylinder by separating the three points on both boundaries by 120 degrees. Then the vertices on one of the boundaries are rotated until three of the edges, connecting both boundaries, are perpendicular to the base of the cylinder. The $(u^{(0)}, u^{(1)})$-coordinates of the parameterized base mesh are displayed in FIG. 5.

As a consequence, a valid embedding $U_o$ can be established trivially by evenly distributing the vertices of the base mesh $M^0$ over the boundaries of $C^2_h$.

The parameterization of an edge is a geodesic of the cylinder. A geodesic can be determined by specifying its direction (negative or positive u-direction) and its number of turns $(0, 1, 2, \ldots )$. The parameterization of an edge $((u_1^{(0)}, u_1^{(1)}), (u_2^{(0)}, u_2^{(1)}))$ of the base mesh is always a geodesic with 0 turns, because the length of the edge is at most ⅓ in the u-direction, and its direction is positive if $u_1^{(0)} <= u_2^{(0)}$ and negative otherwise.

In this way a geodesic triangulation of the cylinder with the connectivity of the base mesh is obtained, resulting in the parameterization $P_0$ of the base mesh.

The obtained hierarchy is now utilized to construct a parameterization of M in a progressive way.

Next Level Parameterization

The obtained parameterization $U_0$ of the base mesh $M^0$ provides a valid starting point for further refinement of the parameterization started in step 3 of the algorithm.

The process consists of iteratively refining the resolution of the parameterization using vertex splits until this ends up with the parameterization $P_m$ of $M^m=M$. The step is generic and runs from a parameterization $P_i$ to the parameterization $P_{i+1}$.

By applying vertex split (step 4) vsplit$_i$ to the embedding $U^{i-1}$ of the level i–1 surface $M^{i-1}$, a new vertex $v_i$ and an embedding $U^i$ of level i surface $M^i$ is obtained.

The initial position (step 5) of the newly introduced vertex $v_i$ is chosen at the centre of the kernel of its 1-ring neighbourhood on the cylinder $C^2_h$, this to avoid foldovers. This initialization always provides a valid embedding $U^i$.

The 1-ring of a vertex (FIG. 6) is defined as the set of triangles neighbouring that vertex. The kernel of this 1-ring is the set of points, within this 1-ring, from which the whole 1-ring is visible. Positioning a new vertex at the centre of the kernel will therefore always result in a valid embedding, i.e. no triangles overlap.

The kernel is computed in the plane using the isometry. The polygon is first transformed to the plane. This is done by setting the y-coordinates of the planar polygon equal to the v-coordinates of the cylindrical polygon. One point of the polygon is then chosen as a reference with x-coordinate set to 0. The x-coordinate of the next vertex in the polygon is determined by calculating the u-length of the geodesic edge between this vertex and the reference vertex (taking into account the direction and the number of turns of the geodesic). Then the u-coordinate of the next vertex is determined relative to the previous vertex until al vertices are assigned a u-coordinate and the planar version of the geodesic polygon is obtained.

The kernel of this planar polygon is constructed using line clipping and calculating its geometric centre. Then the centre to the cylinder is transformed and this coordinate is used as the placement for v. The centre from the plane to the cylinder is transformed using a vertex of the polygon as a reference. The direction and number of turns of each of the edges incident to the vertex v is updated. This results in a parameterization of $M^{i+1}$.

The position of the vertex $v_i$ is then further optimized (step 6), with respect to the distortion measure $\xi_s$ using gradient descent within the bounds of the kernel. The optimization consists of a sequence of line searches. The search direction is the gradient of the distortion measure with respect to the parameter coordinates and each line search is limited to the kernel of the 1-ring of the new vertex. The distortion measure can be evaluated efficiently because movements of vi only affect the triangles of its 1-ring neighbourhood.

Occasionally, when the amount of vertices has increased with a certain factor (e.g. 1.1), a full optimization is run, this in order to allow larger adjustments. In a full optimization run, all vertices are being optimized, one by one, within the kernel of their 1-ring neighbourhood. This process is repeated until the improvement in distortion drops below a certain value (e.g. 0.001). The order in which each vertex is optimized is determined by the distortion reduction that vertex caused in the previous optimization. By optimizing each vertex inside the kernel of their 1-ring, triangle flips are avoided and the embedding is kept valid. Optimizing all vertices simultaneously would also be possible by means of a constrained optimization technique.

When all vertex splits have been applied, the embedding $U^m \equiv U$ of surface $M^m \equiv M$ is obtained. It should be noted that an embedding obtained in this way is valid by construction.

Length Optimization

Step 7, more specifically step 9, of the algorithm involves a length optimization. In currently known methods this length has to be estimated by the user. However, when parameterizing tubular objects that are very long in the axial direction compared to the radial direction, the parameterization gave bad results since the triangles are compressed in the axial direction to fit on the cylindrical domain of length 1. This can be remedied by changing the length of the cylindrical domain. For example when parameterizing a tubular surface that is twice as long in the axial direction as it is in the radial direction, the length of the cylindrical domain can be set to the double of the radius of the cylindrical domain.

In the present invention the length of the cylindrical domain is optimized by calculating the total distortion, and its gradient, of the parameterization with respect to the length of the parameterization domain. The total distortion is defined as the sum of the distortions of all triangles. The length is then changed in such a way that the total distortion decreases. This is repeated until convergence.

In one embodiment the methods of the present invention provide a length optimization step within the iterative parameterization algorithm.

The length h of the cylindrical domain $C^2_h$ is a variable in the optimization problem. The length h that gives rise to the parameterization u with minimal distortion, in terms of $\xi_S$, is considered optimal. A possible approach would be to calculate the optimal parameterization of M on a cylindrical domain of length $h=2\pi$ and optimize the length afterwards. For surfaces where the length/circumference-ratio is approximately one, this approach will generate good results. However, for elongated surfaces, where the length is a multiple of the circumference, large distortions will be introduced into the parameterization and the length can not be estimated accurately. This is due to the fact that, during the construction of the embedding on the cylinder of length $h=2\pi$, the triangles will become squashed in the $u^{(1)}$-direction, to such an extent, that even numerical problems may arise.

The methods of the present invention propose a different strategy. The length is optimized, using Brent's 1D minimization method, at several stages during the progressive construction of the parameterization, namely after each full run of vertex optimizations. In this way, an accurate estimate of the length of the domain is obtained early in the hierarchy. As a consequence, the abovementioned problem does not occur. Moreover, since an accurate estimate is obtained early in the hierarchy, subsequent optimizations converge in a few iterations. The method can be made even more efficient by storing the current Jacobian for each triangle during the full vertex optimization. These Jacobians can then be used to optimize the length: scaling the length of the domain with a factor s simply results in new Jacobians $$J_i^s = J_i \cdot \begin{bmatrix} 1 & 0 \\ 0 & \frac{1}{s} \end{bmatrix}$$

from which the singular values, required for the computation of the distortion s, can easily be derived.

The final optimization problem can be stated as follows:

$$\operatorname*{argmin}_{u_k, h} \xi_S(u) = \frac{\sqrt{2}}{4A_M} \sum_{i \in K} A_i \left( \sqrt{\gamma_i^2 + \Gamma_i^2} + \sqrt{\frac{1}{\gamma_i^2} + \frac{1}{\Gamma_i^2}} \right)$$

subject to $$u_i^{(1)} = 0, \quad \forall i \in V_{B_{II}},$$

$$u_i^{(1)} = h, \quad \forall i \in V_{B_I}.$$

Sampling the Parameterization

In order to sample the parameterization at arbitrary points of the cylindrical domain, the parameterization has to be defined at every point. The interior of a triangle is parameterized using the barycentric map. Therefore sampling the parameterization on a point $(u^{(0)}, u^{(1)}v)$ comes down to finding the geodesic triangle on the cylinder that contains the point $(u^{(0)}, u^{(1)})$. The value of the parameterization is then determined by the barycentric map from that triangle to the corresponding triangle on the tubular surface. To find the triangle containing the point $(u^{(0)}, u^{(1)})$ a point location technique using bounding volume hierarchies may be used.

B. Linear Parameterization Method

In a second aspect the present invention provides a linear parameterization method for cylindrical surfaces.

In this section, a method is introduced for the construction of a cylindrical parameterization by means of a conformal map $u=(u^{(0)}, u^{(1)})$. A map u is conformal if the separate coordinate maps $u^{(0)}$ and $u^{(1)}$ satisfy the Cauchy-Riemann equations:

$$\frac{\partial u^{(0)}}{\partial e^{(0)}} = \frac{\partial u^{(1)}}{\partial e^{(1)}}, \frac{\partial u^{(0)}}{\partial e^{(1)}} = -\frac{\partial u^{(1)}}{\partial e^{(0)}} \quad (1)$$

where $(e^{(0)}, e^{(1)})$ is a parameterization of the local frame on M. Each of the coordinate maps $u^{(0)}$ and $u^{(1)}$ are constructed as a harmonic function. Harmonic functions minimize the Dirichlet energy or, equivalently, are a solution to the Laplace equation:

$$\Delta_M u = 0$$

By imposing suitable boundary conditions, harmonic coordinate maps can be obtained which together satisfy the conformality condition of Eq. (1). Moreover, the optimal length h of the cylindrical parameter domain can be obtained automatically by enforcing conformality at the boundary, and implicitly, due to the properties of harmonic maps, also at the internal vertices. The problem of finding a conformal solution of the Laplace equation can be stated as a linearly constrained convex quadratic minimization problem. The construction of the linear system, solving this optimization problem, will be explained in detail in the examples section.

Figure 7:
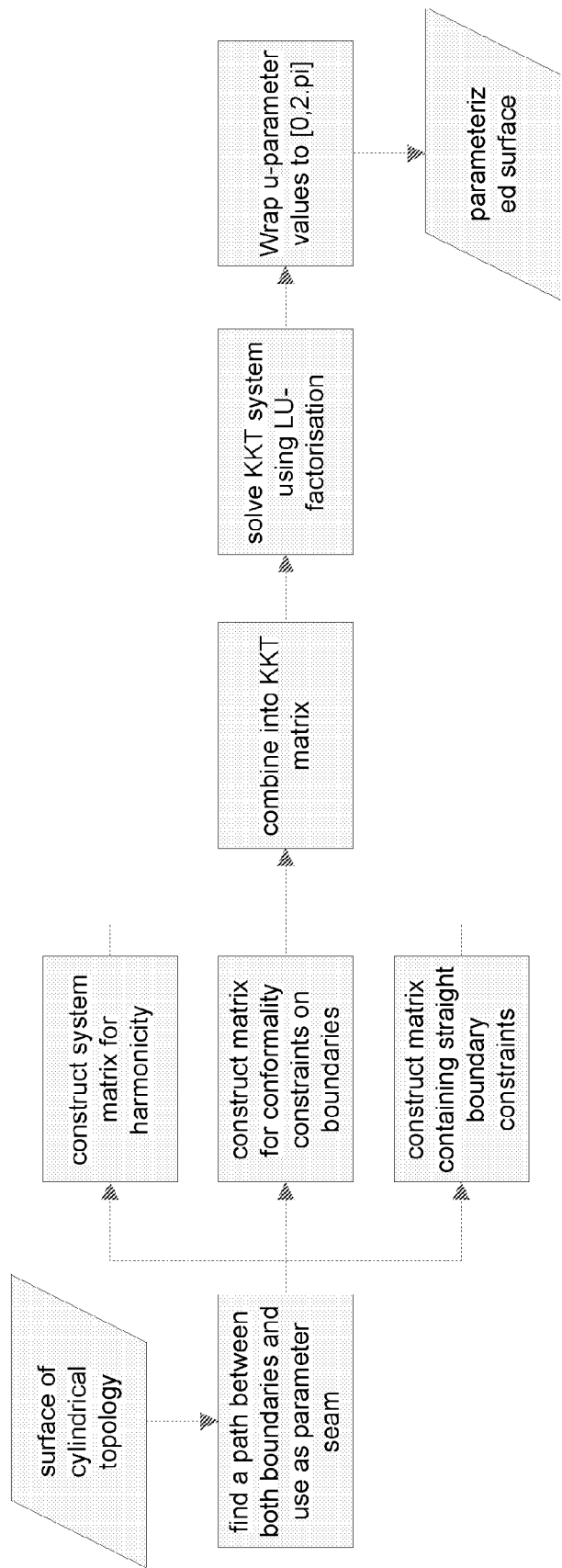
FIG. 7: Flowchart of linear parameterization method.

The linear method generates parameterizations with minimal angle distortion. FIG. 7 shows a flow-chart for the linear parameterization method of a cylindrical surface of the present invention.

Figure 8:
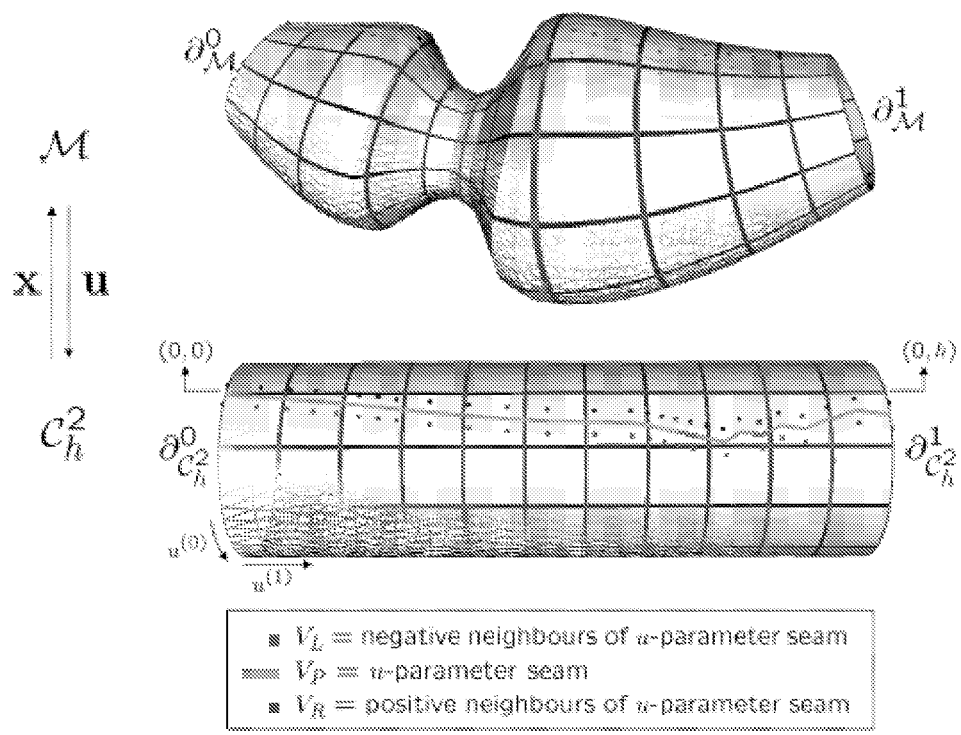
FIG. 8: Top: example surface M with two boundaries. Bottom: parameterization domain $C^2_h$ with two boundaries.

The linear parameterization method of the flowchart starts by finding a simple non-intersecting vertex path between the two boundaries of the cylindrical surface. This path will be used as the parameter seam, i.e. the parametric jump will occur when crossing the path. The neighbouring vertices of the path $V_P$ are divided in two groups: $V_L$ are the neighbours on the left side and $V_R$ are the neighbours on the right side of the path. In FIG. 8 an example surface is shown with vertex path $V_P$ and the path neighbours $V_R$ and $V_L$. The path and neighbours are also shown on the embedding in $C^2_h$. The set of all boundary vertices will be denoted as $V_B = V_{B0} \cup V_{B1}$, where $V_{B0}$ are the vertices of the first boundary and $V_{B1}$ are the vertices of the second boundary.

In a next step three sparse matrices are constructed, taking into account this parametric jump. The construction of these matrices is set out in Example 3. One matrix (A) that ensures that the resulting map will be harmonic in both parametric coordinates, i.e. the Laplacian vanishes everywhere. Also, a matrix (C) that contains constraints that enforce conformality at the boundaries is constructed. Finally, a matrix (E) is constructed with constraints that enforce the boundaries of the parameterization to be straight circles on the cylindrical domain and that eliminate the rotational degree of freedom around the cylinder.

The obtained system matrix and the constraint matrices are combined into the Karush-Kuhn-Tucker (KKT) matrix and solved using the LU-factorisation. In this way, a parameterization is obtained that is harmonic, conformal, and has optimal length of the cylindrical domain. The parametric jump is aligned with the path between the two boundaries and by wrapping the values to [0,2pi] the final parameterized surface is obtained.

Automatic Length Optimization

The Dirichlet energy still has multiple minima because the Dirichlet energy is invariant with respect to translations of the map u on the cylinder. These degrees of freedom, however, can be removed by fixing a single point of the parameterization. Here, the point at the intersection of one of the boundaries with the path VP is chosen and it will be fixed at 0. Also, in order to have a bijective map between the surface M and the cylinder $C^2_h$ of length h, the image of the boundaries of M needs to be constrained to the boundaries of $C^2_h$. This can be achieved by adding extra boundary constraints: for each boundary vertex one constraint is added that fixes its $u^{(1)}$-parameter to that of its boundary vertex. Note, that with these constraints the vertices of the boundaries will be mapped to the isocircles $u^{(1)}=0$ and $u^{(1)}=h$ on $C^2_h$, but without fixing h. In this way, the length h of the cylindrical domain, resulting in a map with minimal Dirichlet energy, will be chosen automatically. The obtained constraints can be formulated as a linear system Eu=0, where the system matrix is sparse.

Note that one can drop the straight boundary constraints in order to obtain a free-boundary parameterization on the cylinder. By trimming both ends of the resulting parameterization, a one-to-one map between the trimmed surface and the cylinder can be obtained. Such an approach is useful to avoid large distortions at jagged surface boundaries when an exact correspondence between the surface boundary and the domain boundary is not required.

Final Linear System

Finally, the problem of obtaining a conformal harmonic map u: $M \to C^2_h$ with optimal length h can be formulated as the following optimization problem:

$$\min_{u_k, h} \xi_D(u) = \frac{1}{4} \sum_{(i,j) \in K} \omega_{ij} \|u_{ij}\|^2 \quad (2)$$

subject to $$u_i^{(1)} = u_j^{(1)}, \quad \forall i \in V_{B_0}, \forall j \in V_{B_0},$$

$$u_i^{(1)} = u_j^{(1)}, \quad \forall i \in V_{B_i}, \forall j \in V_{B_1},$$

$$u_i = 0, \quad \text{for } i = V_{B_0} \cap V_P,$$

$$\sum_{j \in N_i} \omega_{ij} u_{ij} = \left( u_{in_i\,i} + u_{ii_0} \right)^\perp, \quad \forall i \in V_B,$$

This is a convex quadratic programming problem with linear equality constraints. Here, the $\omega_{ij}$ are the cotangent weights of the edge $v_i v_j$. This problem can be transformed in to a linear system by the use of Lagrange multipliers:

$$\begin{bmatrix} A & C^T & E^T \\ C & 0 & 0 \\ E & 0 & 0 \end{bmatrix} \cdot \begin{bmatrix} u \\ \lambda_1 \\ \lambda_2 \end{bmatrix} = \begin{bmatrix} b \\ d \\ 0 \end{bmatrix} \quad (3)$$

where the system matrix is the Karush-Kuhn-Tucker (KKT) matrix associated with the quadratic programming problem (Nocedal and Wright, Numerical Optimization, Springer Series in Operations Research, Springer, N.Y., 1999). The matrix A ensures that the coordinate maps are harmonic, matrix C contains the conformality constraints, and matrix E eliminates the rotational degree of freedom and straightens the boundaries of the parameterization. The solution ($u^*, \lambda^*_1, \lambda^*_2$) of this system provides the conformal map $u^*$ and the optimal Lagrange multipliers ($\lambda^*_1, \lambda^*_2$) for the constraints. In this embodiment, LU-decomposition is used to solve the above system. The parametric jump of the obtained map $u^*$ occurs along the path $V_P$. The modulo-$2\pi$ operator is applied to the values of the map $u^*$ in order to obtain a map u that is within [0, $2\pi$[×[0, h]. Finally, the parameterization is obtained as $x=u^{-1}$.

Note that it is possible to subject the optimization problem of Eq. (2) to additional constraints, simply by extending the KKT system of Eq. (3). For example, by using appropriate constraints, one could fix the certain landmarks to a predetermined position on the parameterization domain. This is particularly useful for constructing landmark based correspondences between tubular surfaces. This is not possible with the conformal method of Hong et al. (2006).

In another embodiment the present invention provides a linear parameterization method further comprising a constraint mechanism in order to be able to predefine the map u for certain points of the surface M. This is particularly useful for the construction of consistent parameterizations which are used in shape modelling and analyses applications. The way the linear parameterization problem is formulated here allows the addition of constraints simply by adding extra linear equations. Moreover, since the linear parameterization method determines both parameterization coordinates simultaneously, it is even possible to add constraints that relate these two constraints. This was not possible with previous methods.

C. Combined Linear and Non-Linear Parameterization Method

The present invention also provides a method that combines the speed of the linear method with the low distortions of the non-linear method. In one embodiment said method is provided for parameterization of cylindrical surfaces.

The linear method generates parameterizations with very minimal angle distortion. However, for surfaces with substantial variation in cross-sectional diameter, the non-linear method is advised, optimizing both angle and area distortion.

In one embodiment a non-linear surface parameterization step is preceded by a linear surface parameterization step. However, to avoid converging into a local minimum, another embodiment provides a method for surface parameterization of a tubular surface onto a cylinder, comprising the steps of: a) parameterizing via a linear method; b) calculating the best position of each vertex within its 1-ring by a non-linear optimisation of the balanced distortion measure as described above; c) solving a linear problem using the resulting local optimal positions in a matrix, minimizing not the harmonic energy, but the energy needed to position the vertices within their 1-ring as determined in step b; and d) repeating the steps from step b until the parameterization does not change anymore.

Steps a and b can be implemented on the GPU (graphical processing unit) hereby enjoying massive parallellism. The sparse linear systems of steps a and c can be solved on the GPU using the method from "Buatois et al, Concurrent Number Cruncher: An Efficient Sparse Linear Solver on the GPU, High Performance Computation Conference, Springer Lecture Notes in Computer Sciences, 2007". The non-linear minimization of the vertices within their respective 1-rings can be solved in parallel by conjugate gradient on the GPU.

The invention will now be further explained by the following examples.

Example 1

Generating a Dissection View of the Colon Through Stretch Optimized Colon Flattening In a specific embodiment the present invention provides a method for flattening of the colon. The flattening is obtained by minimization of the non-linear stretch metric and the method is made robust and efficient through utilization of a surface hierarchy. In this way, the flattening is generated within minutes. The resulting flattenings are low in both angle and area distortion. As opposed to traditional conformal flattening techniques, which often introduce large area distortions, the method avoids severe down-scaling even for very pronounced protrusions, increasing the detection probability.

1.1 Cylindrical Parameterization of Colon Surface

When using the method as described above, a dissection view of the colon is generated. The method starts from the surface of the colon wall that has the topology of an open ended cylinder. This surface is first progressively parameterized to an open-ended cylinder of optimal length h, while keeping the introduced stretch to a minimum. Then, the cylinder is cut into a topological disc and unfolded to a planar rectangle of length h. In order to obtain from-the-centreline-view lighting, the unfolded mesh is equipped with appropriate normals. A high quality dissection view can be obtained from a flattened surface using standard surface rendering software.

1.2 Mapping the Cylindrically Parameterized Surface to the Planar Rectangle

Using the inverse map u of the cylindrical parameterization, the colon surface can easily be unfolded into a planar rectangle. The $u^{(0)}=0$ iso-line is traced over the surface M going from u=(0, h) on the first boundary to u=(0, 0) on the second boundary by following the direction $(\nabla u^{(0)})^\perp$, were $\perp$ is a 90° counterclockwise rotation. The colon surface is then cut open along the traced iso-line. Finally, the obtained topological disc is unfolded to a planar $2\pi \times h$ rectangle by putting each vertex p at the position determined by the inverse of the parameterization: u(p).

1.3. Visualization—from-the-Centreline View Rendering of the Unfolded Surface

In order to add shape information to the flattened colon, it is shaded as if each point was observed from the centreline. Such shading is obtained by equipping the vertices of the flattened colon with appropriate normal vectors. A parametric centreline of the colon can be obtained from the parameterization x by integration over the its first parameter:

$$c(t) = \frac{1}{2\pi} \int_0^{2\pi} x(s, t) ds$$

The normals at the vertices of the 3D colon surface are obtained from the gradient of the CT image. The angle θ between the surface normal and the viewing direction, with the camera positioned at the corresponding centreline point, is calculated. The vertex in the flattened colon surface is assigned a normal that results in the same angle θ and thus also the same lighting. Finally, the flattened colon is visualized by ordinary surface rendering in parallel projection with a single headlight and Phong fragment shading provides fine-grain realism.

Figure 9:
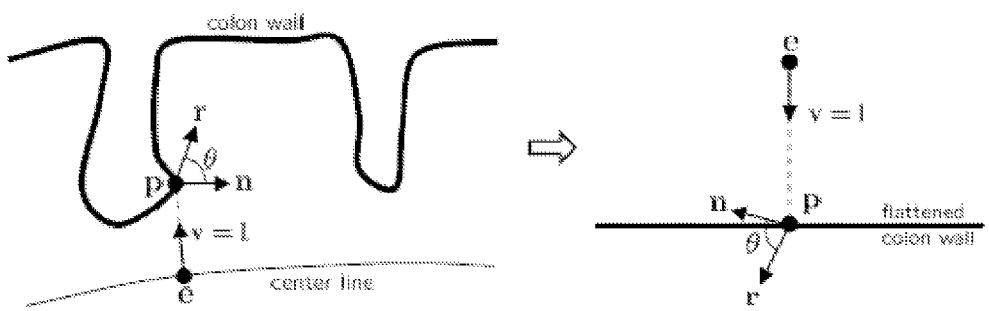
FIG. 9: Visualization.

FIG. 9 illustrates a visualisation. The left Figure shows the 3D colon surface vertex p, with normal vector n, observed from the corresponding point e of the centreline. The position of the point light is fixed to the view point e, thus the light vector l coincides with the view vector v. In such a configuration, the angle θ (or equivalently the dot product) between the normal n and the reflection vector r completely determines the lighting at point p. The right Figure shows that choosing the normal at the vertex of the 2D flattened colon surface to have the same angle θ with the reflection vector results in the exact same lighting as in the 3D scene.

Example 2

Comparison of Colon Stretch Method with Conformal Method

Figure 10:
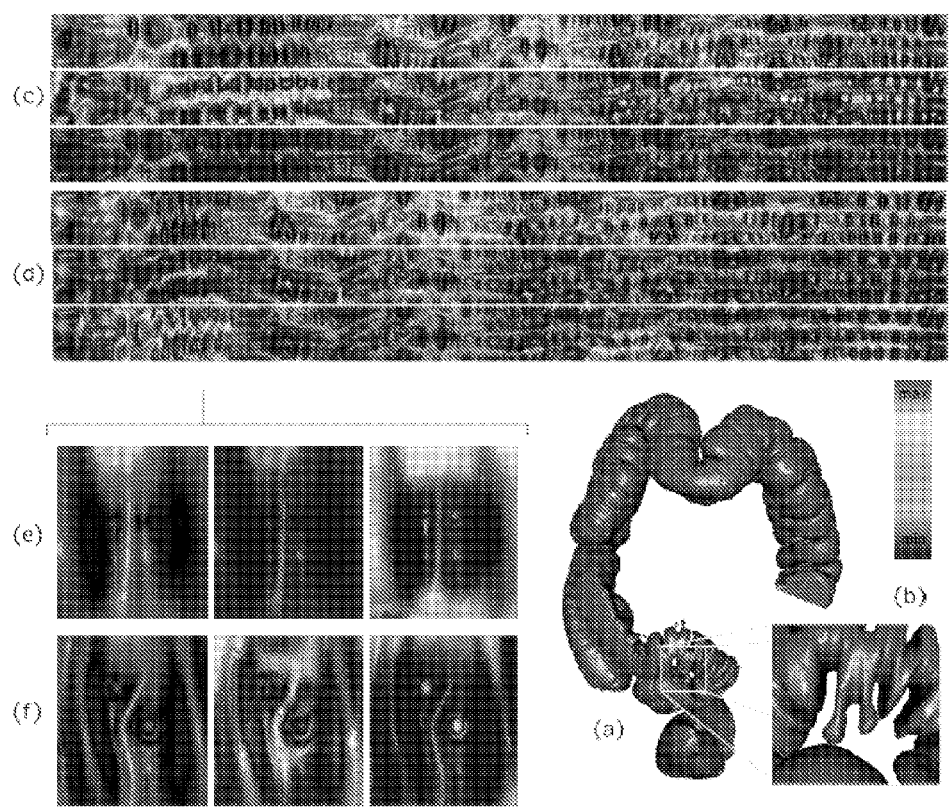
FIG. 10: Conformal versus stretch optimized colon flattening.

The topologically cylindrical colon surface M, counting 1.3M triangles, was extracted from a CT data set of the abdomen. The CT volume measured 512×512×532 voxels of size 0.78×0.78×0.8 mm$^3$. The colon surface was parameterized using the progressive stretch minimization technique of this invention and also using the conformal method of Haker et al. (2000b). Both parameterizations were unfolded to the plane and rendered with the techniques of Section 2.2 and Section 2.3. The resulting unfolding is shown in FIG. 10. FIG. 10 illustrates: (a) Surface of the colon. (b) Magnification of part of the colon surface that exhibits significant down-sizing in the conformal flattening. (c) Flattened colon using conformal method. The final rendering is shown at the top and a map of the area distortion and the angle distortion is shown at the bottom. (d) same as in (c) but for the stretch optimization method. (e) Magnification of part of the conformally flattened colon, corresponding to the part of the colon shown in (b), From left to right: final rendering, angle distortion, and area distortion. (f) Same as in (e) but for the stretch optimization method. From (e) and (f) it can be seen that narrow protruding parts are significantly down-sized. This is not the case with the method of the present invention.

The angle distortion_C and the area distortion_A, introduced by the flattening, are calculated as follows:

$$\xi_C(u) = \frac{1}{2A_M} \sum_{t \in K} A_t \left( \frac{\gamma_t}{\Gamma_t} + \frac{\Gamma_t}{\gamma_t} \right)$$

$$\xi_A(u) = \frac{1}{2A_M} \sum_{t \in K} A_t \left( \gamma_t \Gamma_t + \frac{1}{\gamma_t \Gamma_t} \right)$$

The distortion values for both techniques are reported in Table 1. It can be seen that the conformal method introduces severe area distortions in order to keep the angle distortions to a minimum. The method of the present invention, on the other hand, keeps both the area and angle distortion low. This can also be observed in FIG. 10, where the flattened colon is overlaid with the local area and angle distortion. The subfigures 10(e) and 10(f) show a part of the flattened colon image that corresponds to severe protrusions. In the stretch optimized flattening the protrusions are clearly visible, but in the conformal flattening they have almost entirely disappeared. The conformal flattening is based on the solution of a large but sparse linear system and thus very efficient. The method of the present invention is based on non-linear optimization and is computationally more complex, but it can be seen from Table 1 that the computation time for this colon, counting 1.3M triangles, is less than 14 minutes. In exchange for an improved visibility of certain polyps, this increased computation time certainly is justified.

TABLE 1

|  | method | |
| --- | --- | --- |
|  | conformal | stretch |
| angle | 1.002 | 1.068 |
| area | 106.671 | 1.091 |
| time (s) | 100 | 924 |

Calculation time and distortion measures for conformal flattening and the stretch optimized flattening. Although the conformal method is an order of magnitude faster than the non-linear method and generates a flattening with lower distortion in angles, the conformal method introduces high distortions in area. This is particularly observed in areas that require large deformation in order to be transformed, e.g. protruding polyps. The non-linear method, in contrast, results in maps that exhibit both low area and angle distortions at the expense of an increased computation time.

Example 3

Linear Parameterization for Cylindrical Surfaces

This example further illustrates the construction of the three sparse matrices A, C and E as mentioned above.

The Dirichlet energy, the Laplacian operator, and the boundary conditions will all be formulated in terms of the lengths of the edges $u_{ij}$ of the embedding of K in $C^2_h$. The length of $u_{ij}$ can be calculated using the coordinates of the end points $u_i$ and $u_j$ of the edge, i.e.

$$\|u_{ij}\|^2 = \|u_i - u_j\|^2 \qquad (4)$$
$$= (u_i^{(0)} - u_j^{(0)})^2 + (u_i^{(1)} - u_j^{(1)})^2.$$

Since the parameterization domain is periodic along parameter $u^{(0)}$, some edges will cross the parametric seam $u^{(0)} = 0 = 2\pi$. For those edges, the above expression does not calculate the correct length. Given a surface M, a vertex path $V_P$, connecting $\partial_M^0$ with $\partial_M^1$, is introduced on the surface. The path $V_P$ should not self-intersect and it can have only one vertex on each boundary. The neighbouring vertices of the path $V_P$ are divided in two groups: $V_L$ are the neighbours on the left side and $V_R$ are the neighbours on the right side of the path (FIG. 8).

Now, any given cylindrical map u can be modified to have its parametric jump along any path $V_P$. This can be accomplished without affecting the edge lengths $u_{ij}$ and, as a consequence, also without affecting the Dirichlet energy of the map. Therefore, only maps u are considered with the 27 parametric jump occurring along the vertex path $V_P$ instead of at $u^{(0)}=0=2\pi$ and this without loss of generality.

Figure 11:
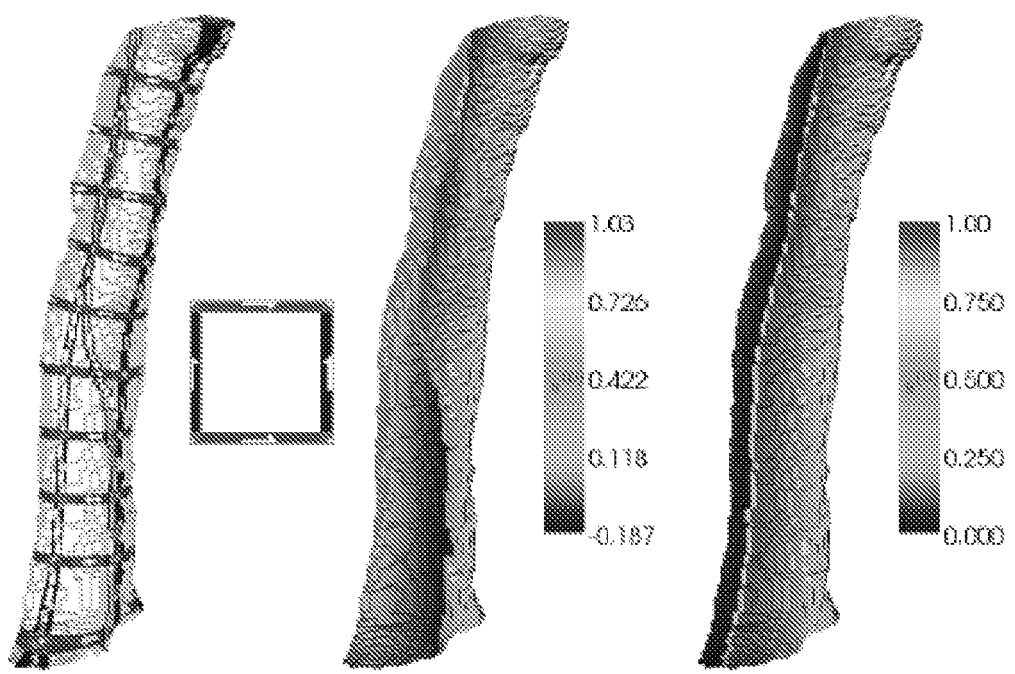
FIG. 11: Cylindrical parameterization of the human trachea using a conformal map u.

Requiring the map to have the parametric jump along the $V_P$ will result in values for $u^{(0)}$ exceeding the interval $[0, 2\pi)$. They are mapped back into the interval afterwards using the modulo-$2\pi$ operator. FIG. 11 shows an example embedding with one map having the parameter jump along the path $V_P$ and the other map having the parameter jump at $u^{(0)}=0=2\pi$. With this setting, a general formula for the vector $u_{ij}$ can be derived for which Eq. (4) will always give the correct length:

$$u_{ij} = \begin{cases} \begin{pmatrix} u_i^{(0)} - u_j^{(0)} - 2\pi \\ u_i^{(1)} - u_j^{(1)} \end{pmatrix} & \text{if } i \in V_L \text{ and } j \in V_P \\ \begin{pmatrix} u_i^{(0)} - u_j^{(0)} + 2\pi \\ u_i^{(1)} - u_j^{(1)} \end{pmatrix} & \text{if } i \in V_P \text{ and } j \in V_L \\ \begin{pmatrix} u_i^{(0)} - u_j^{(0)} \\ u_i^{(1)} - u_j^{(1)} \end{pmatrix} & \text{otherwise.} \end{cases} \quad (5)$$

Note, that any path, without self intersections, connecting $\partial_M^0$ with $\partial_M^1$, can be used in this strategy and this without influencing the final parameterization. In this work, the vertex path with the shortest geodesic distance between the two boundaries is used.

Figure 6:
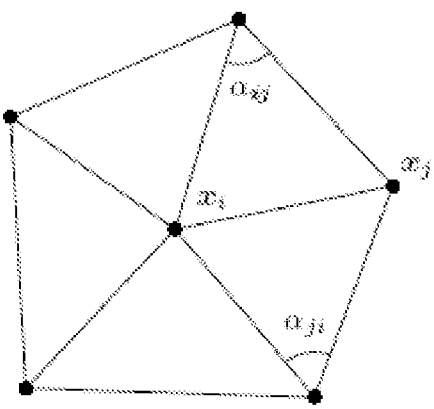
FIG. 6: A vertex one-ring on M.

For a given map u, the Dirichlet energy $\xi_D$ is defined as:

$$\xi_D(u) = \frac{1}{2} \int_M \|\nabla u\|^2 = \frac{1}{4} \sum_{(i,j) \in K} \omega_{ij} \|u_{ij}\|^2, \quad (6)$$

where the integral becomes a sum because, within a triangle, the map is linear and has constant gradient (Pinkall and Polthier, Computing Discrete Minimal Surfaces and Their Conjugates, Experimental Mathematics 2 (1) (1993) 1536). The weights $w_{ij}$ are the harmonic weights:

$$\omega_{ij} = \begin{cases} \frac{1}{2}(\cot\alpha_{ij} + \cot\alpha_{ji}) & \text{if } (i, j) \text{ internal} \\ \frac{1}{2}\cot\alpha_{ij} & \text{if } (i, j) \text{ on boundary,} \end{cases}$$

where $\alpha_{ij}$ and $\alpha_{ij}$ are the angles on M opposite to the edge (i, j) in the two triangles adjacent to the edge (i, j) as shown in FIG. 6. For each edge (i, j), $u_{ij}$ is the vector connecting both vertices of the edge in the parameter space $C^2_h$ as defined in Eq. (5). The discrete Laplace operator $\Delta_M$ is defined as the derivative of the discrete Dirichlet energy_D. The Laplacian of a map u at vertex i on the surface M is defined as:

$$(\Delta_M u)_i = \frac{\partial \xi_D(u)}{\partial u_i} = \frac{1}{2} \sum_{j \in N_i} \omega_{ij} u_{ij},$$

where $N_i = \{j | (i, j) \in K\}$ is the set of 1-ring neighbours of vertex i. A harmonic map u can now be obtained as a minimizer of the Dirichlet energy, or, equivalently, as the solution of the Laplace equation:

$$(\Delta_M u)_i = \sum_{j \in N_i} \omega_{ij} u_{ij} = 0, \forall i. \quad (7)$$

This system of linear equations can be formulated as Au=b. Here, $u = (u^{(0)}_0, u^{(1)}_0, \ldots, u^{(0)}_{n-1}, u^{(1)}_{n-1})^T$ is the vector of unknowns defining the map. The system matrix A is sparse with non-zeros $$A_{2i,2j} = A_{2i+1,2j+1}$$
$$= \begin{cases} -\sum_{k \in N_i} \omega_{ik} & \text{if } i = j \\ \omega_{ij} & \text{if } j \in N_i, \end{cases}$$
$$\forall i, \forall j.$$

The right-hand side $b = (b_0, \ldots, b_{2n-1})$ is also sparse. The non-zeros relate to the parametric jump along the path $V_P$ and correspond to the constant parts of the $u_{ij}$'s brought to the right side of Eq. (7). If vertex i is in $V_L$ or $V_P$ and has neighbours in $V_P$ or $V_L$ respectively then $b_{2i}$ will be non-zero:

$$b_{2i} = 2\pi |\{j | i \in V_L \text{ and } j \in N_i \cap V_P\}| - 2\pi |\{j | i \in V_P \text{ and } j \in N_i \cap V_L\}|, \forall i.$$

In its current form, the linear system Au=b is singular and has infinitely many solutions due to the periodicity. Suitable boundary conditions will reduce the solution set to a singleton.

In Desbrun et al. (Intrinsic Parameterizations of Surface Meshes, Computer Graphics Forum 21, 2002), the conformality of the harmonic coordinate maps for disc-like surfaces is obtained by enforcing the following condition along the surface boundary:

$$\nabla_n u = (\nabla_t u)^\perp, \quad (8)$$

where r• is the directional derivative, n is the direction normal to the boundary, t is the direction tangential to the boundary, and ⊥ is a 90_counterclockwise rotation, i.e. (x, y)⊥=(-y, x). In this work, their strategy is adopted and the boundary condition of the above equation is enforced at $\partial_M^0$ and $\partial_M^1$. Let the set of vertices on boundary $\partial_M^0$ and $\partial_M^1$ be denoted as $V_B$. Then, the conformality condition is captured in following system of equations:

$$\sum_{j \in N_i} \omega_{ij} u_{ij} = (u_{i_{R_i}} + u_{ii_1})^\perp, \forall i \in V_B.$$

where $i_1$ and $i_{ni}$ are the first and the last neighbouring boundary vertices of i when traversing the neighborhood of vertex i counter-clockwise. Now, given a boundary vertex $i \in V_B$, let I be the corresponding index in the set $V_B$. Then, these constraints can be formulated as a linear system Cu=d, where the system matrix is sparse and has non-zeros $$C_{2i,2i_1+1} = C_{2i,2i_1} = -1, \forall i \in V_B,$$
$$C_{2i,2i_{R_i}+1} = C_{2i,2i_{R_i}} = 1, \forall i \in V_B,$$

-continued $$C_{2i,2j} = C_{2i+1,2j+1}$$

$$= \begin{cases} -\sum_{k \in N_i} \omega_{ik} & \text{if } i = j \\ \omega_{ij} & \text{if } j \in N_i \setminus (i_1, i_{R_i}), \end{cases}$$

$$\forall i \in V_B, \forall j.$$

and the right-hand side is also sparse and has non-zeros $$d_{2i} = 2\pi |\{j | i \in V_L \text{ and } j \in N_i \cap V_P\}| - 2\pi |\{j | i \in V_P \text{ and } j \in N_i \cap V_L\}|,$$

$$\forall i \in V_B.$$

$$d_{2i+1} = \begin{cases} 2\pi & \text{if } i \in V_L \text{ and } i_1 \in V_P \\ -2\pi & \text{if } i_m \in V_L \text{ and } i \in V_P, \end{cases}$$

$$\forall i \in V_B.$$

The Dirichlet energy of Eq. (6) under the conformal boundary constraints of Eq. (8) still has multiple minima because the Dirichlet energy is invariant with respect to translations of the map u on the cylinder. These degrees of freedom, however, can be removed by fixing a single point of the parameterization.

Here, the point at the intersection of the boundary $\partial_M^0$ with the path $V_P$ is chosen and it will be fixed at 0. Also, in order to have a bijective map between the surface M and the cylinder $C^2_h$ of length h, the image of boundary $\partial_M^0$ and $\partial_M^1$ needs to be constrained to boundary $\partial_{C_h^2}^0$ and $\partial_{C_h^2}^1$ respectively. This leads to the following boundary constraints:

$$\begin{cases} u_i^{(1)} = u_j^{(1)}, & \forall i \in V_{B_0}, \forall j \in V_{B_0}, \\ u_i^{(1)} = u_j^{(1)}, & \forall i \in V_{B_1}, \forall j \in V_{B_1}, \\ u_i = 0 & \text{for } i = V_{B_0} \cap V_P. \end{cases} \quad (9)$$

where VB0 is the set of vertices on boundary $\partial_M^0$ and $V_{B1}$ is the set of vertices on boundary $\partial_M^1$. Note, that with these constraints the vertices of boundary will be mapped to the isocircle $u^{(1)}=0$ on $C^2_h$. The vertices on $\partial_M^1$ will be mapped to the iso-circle $u^{(1)}=h$, but without fixing h. In this way, the length h of the cylindrical domain, resulting in a map with minimal Dirichlet energy, will be chosen automatically. The constraints of Eq. (9) can be formulated as a linear system Eu=0, where the system matrix is sparse and has following non-zeros $$E_{ij} = -E_{ij_1} = 1, \forall i \in V_B$$

$$E_{|V_B|i} = 1, \text{ for } i = V_{B_0} \cap V_P$$

$$E_{|V_B|+1,i+1} = 1, \text{ for } i = V_{B_0} \cap V_P$$

where I is the index in $V_B$ for vertex i and is the first encountered boundary vertex when the neighbourhood of vertex i is traversed in counter-clockwise direction. Note that one can drop the first two constraint sets of Eq. (9) in order to obtain a free-boundary parameterization on the cylinder. By trimming both ends of the resulting parameterization, a one-to-one map between the trimmed surface and the cylinder can be obtained. Such an approach is useful to avoid large distortions at jagged surface boundaries when an exact correspondence between the surface boundary and the domain boundary is not required.

FIG. 11 illustrates the cylindrical parameterization of the human trachea using a conformal map u. On the left, the parameterized trachea surface is shown. A texture is used to reveal the parameterization. In the middle, the trachea is shown with a color indicating the value of the periodic coordinate $u^{(0)}$. It can be seen that the parametric jump is located along the vertex path VP. Also, it can be seen that the actual values of $u^{(0)}$, at which the jump occurs, differ along the seam. On the right, the periodic coordinate u(0) is mapped into [0, $2\pi$) in order to have the parametric jump at $u^{(0)}=0=2\pi$.

Example 4

Comparison Between Linear and Non-Linear Parameterization Method

The linear and the non-linear parameterization method proposed in the present invention, are analysed in terms of different distortion measures and execution time. Also, as a reference, the performance is compared with the method of Haker et al. (2000b), a conformal parameterization method from the literature. The Haker method is easy to implement and results in maps equal to those generated by the method of Hong et al. (2006). This method is also linear and constructs a conformal parameterization in three steps. First the $u^{(1)}$-coordinate is found as the solution of a Dirichlet problem. Then, the surface is dissected along a gradient descent path. Finally, the $u^{(0)}$-coordinate is obtained by a second Dirichlet problem, where the boundary conditions are provided by the conformality condition. It should be noted that a slightly improved version of Haker's algorithm is used here. Haker suggested using a vertex based gradient descent path, while in this work a smooth gradient descent path is obtained by interpolating the $u^{(1)}$-coordinate over the triangles. The choice of the path is important in Haker's method, because it will be the $u^{(0)}=0$ iso line and it directly influences the final parameterization result. Note that for the linear method of the present invention the choice of the path does not influence the final result.

Figure 12:
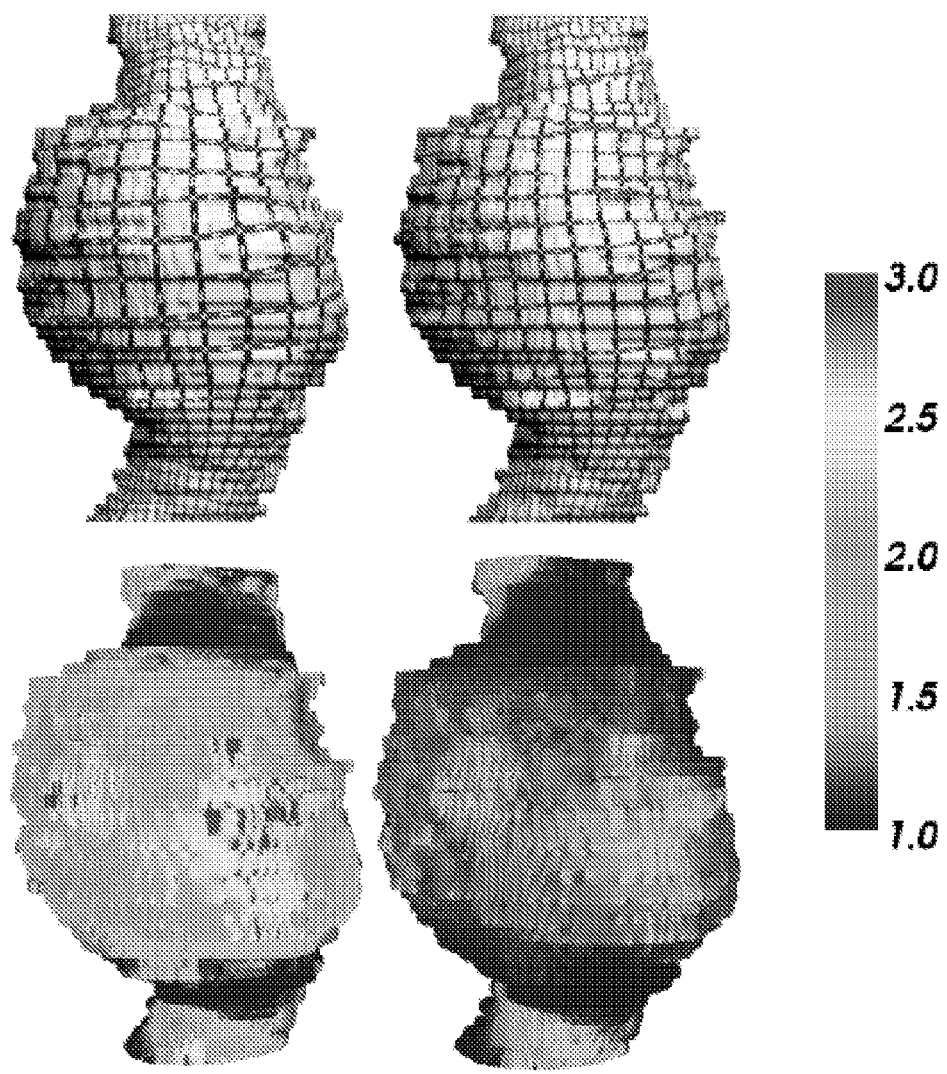
FIG. 12: Comparison of the parameterization generated by the linear (left) and non-linear (right) method for a thrombus surface with substantial variation in cross-sectional diameter.

FIG. 12 illustrates, by way of example, a comparison of the parameterization generated by the linear (left) and non-linear (right) method for a thrombus surface with substantial variation in cross-sectional diameter. The top shows a visualization of the parameterization through iso-parametric lines, while the bottom shows a visualization of the distortion $\xi_A$ of the triangle area.

4.1. Data Sets

A large number of data sets were used in the comparison, this in order to provide a reliable evaluation of the performance of the different methods. By the use of the marching cubes algorithm, the following data sets were derived from segmented ct-scans of human tissue and bone: a set of clavicles which are topologically modified to cylinders, a set of cochlear channels, a set of aortic sections with a thrombus, a set of tracheas, and two colon data sets. The number of data sets in each population together with the average number of vertices for a surface in each population is shown in Table 2. The methods were tested on all of these surfaces and distortion measures and execution times are reported per population, allowing for a statistical comparison.

TABLE 2

Data sets used in the evaluation.

| population | size | avg(n) |
|---|---|---|
| clavicles | 20 | 61k |
| cochleas | 6 | 256k |
| thrombi | 25 | 83k |
| tracheas | 20 | 36k |
| colons | 2 | 650k |

4.2. Distortion Measures

The quality of a parameterization is evaluated using four distortion measures: the total Dirichlet energy $\xi_D$, the total stretch distortion $\xi_S$, the total area distortion and the total angle distortion $\xi_C$. All measures can be expressed in function of the singular values, $\gamma_t$ and $\Gamma_t$ of the Jacobian of the affine maps $u|_t$.

$$\xi_D(u) = \frac{1}{2A_M} \sum_{i \in K} (\gamma_i^2 + \Gamma_i^2)$$

$$\xi_S(u) = \frac{\sqrt{2}}{4A_M} \sum_{i \in K} A_t \left( \sqrt{\gamma_t^2 + \Gamma_t^2} + \sqrt{\frac{1}{\gamma_t^2} + \frac{1}{\Gamma_t^2}} \right)$$

$$\xi_A(u) = \frac{1}{2A_M} \sum_{i \in K} A_t \left( \gamma_t \Gamma_t + \frac{1}{\gamma_t \Gamma_t} \right)$$

$$\xi_C(u) = \frac{1}{2A_M} \sum_{i \in K} A_t \left( \frac{\gamma_t}{\Gamma_t} + \frac{\Gamma_t}{\gamma_t} \right)$$

All these measures have a minimal value of 1. For harmonic maps $\xi_D$ is minimal. When a map has no angle distortion it is conformal and minimizes $\xi_C$. The area distortion measure $\xi_A$ on the other hand, is minimized for authalic maps. A map that preserves both angles and areas is isometric and minimizes the stretch metric $\xi_S$. Note, that only developable surfaces can be parameterized isometrically. For a selection of parameterizations, the contribution of each triangle to the above measures will be visualized on the surface by the use of a colour map. A high quality parameterization should have balanced angle and area distortions.

4.3. Quantitative Comparison

Figure 13:
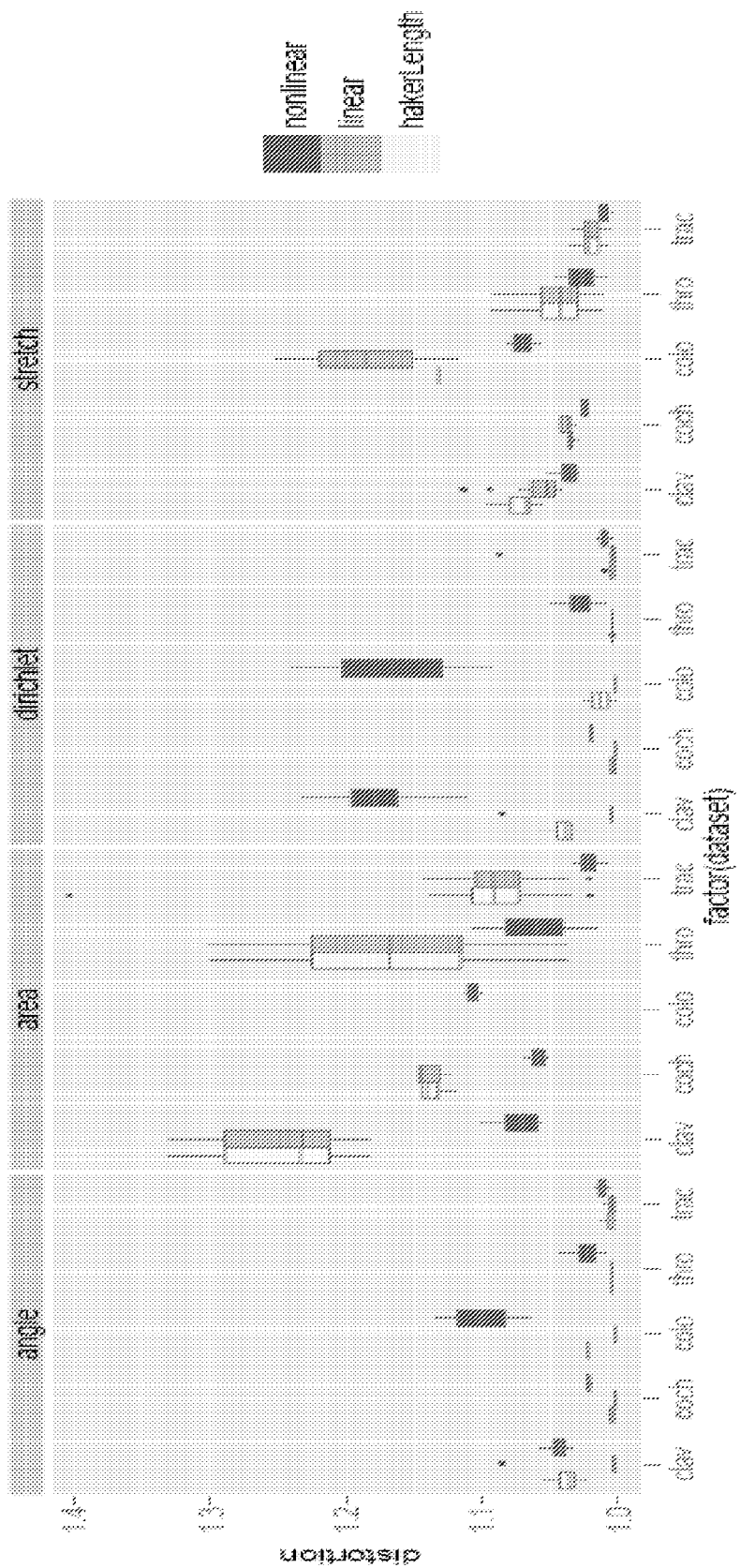
FIG. 13: Comparison of the distortion measures for the different methods and populations.
Figure 14:
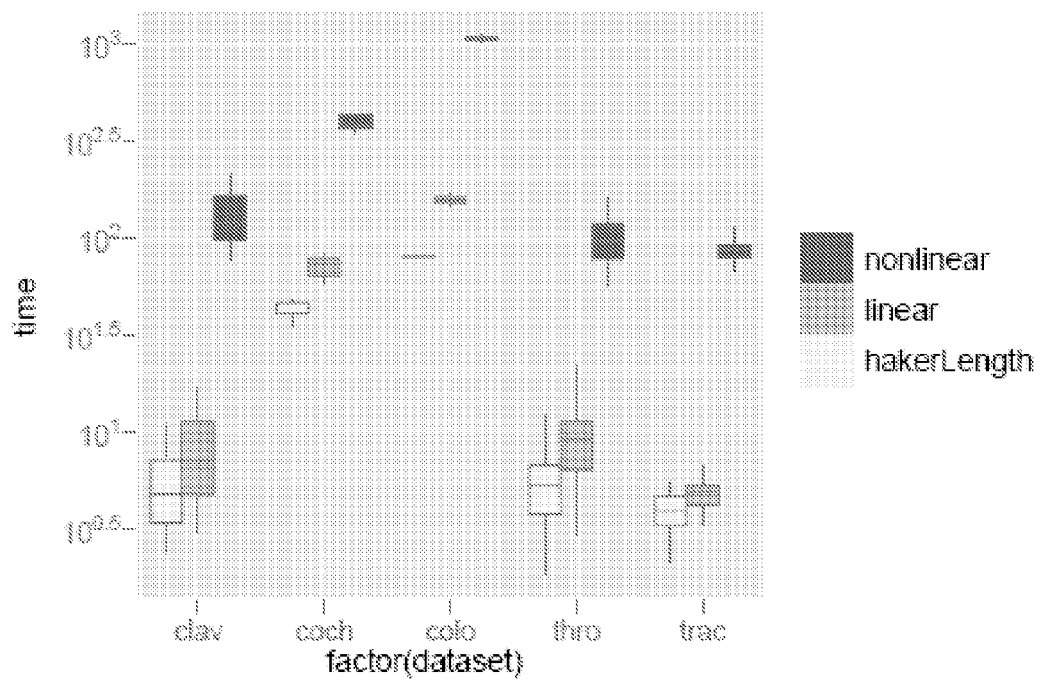
FIG. 14: The execution time (in seconds) for the parameterization of a single surface, reported for the different populations and methods.
Figure 15:
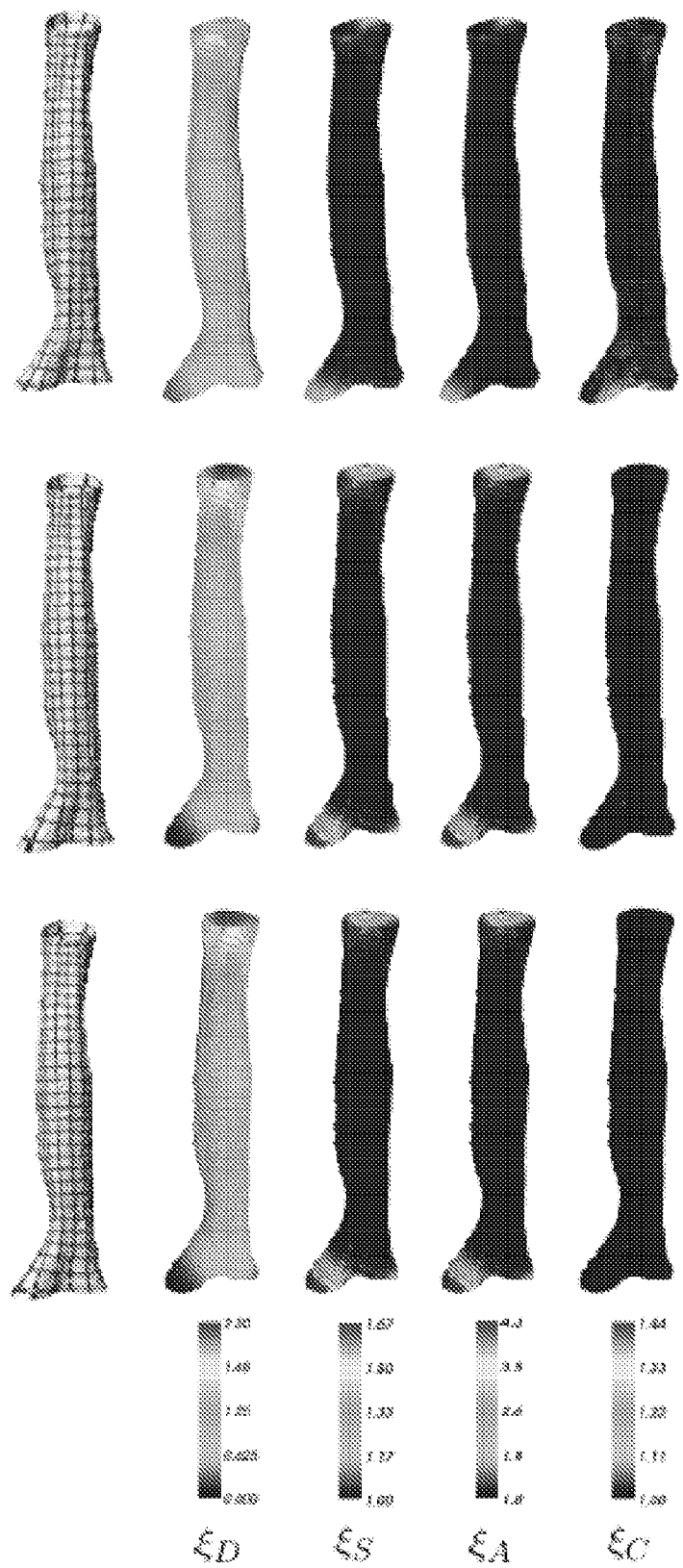
FIG. 15: A visualization of the parameterization of a trachea surface and the contribution of the triangles to the different distortion measures.

Each surface of the populations listed in Table 2 is parameterized using the linear and the non-linear method of the present invention and also with Haker's linear method. In FIG. 13, a box plot of the distortion measures $\xi_D$, $\xi_S$, $\xi_A$, and $\xi_C$ is shown for each population and method. FIG. 14 shows a boxplot of the execution time of each method for each population. In FIGS. 15, 21, and 22 the contribution of each triangle to the distortion measures is visualized for a sample of the trachea population, the thrombus population, and the colon population, respectively.

It should be noted that some outliers were left out of the analysis in FIG. 13. This is done because the influence of extreme outliers on the average case would be out of proportion. These outliers are the result of jagged geometry at the boundaries of the surfaces that can only be mapped to the circular cylinder boundary with large distortions. Extreme distortions were observed at very small parts of a few surfaces and only for the linear methods. This is not surprising because strict adherence to the conformality constraint can result in extreme area distortion. From a total of 885 measurements, 15 were considered as extreme outliers.

Figure 16:
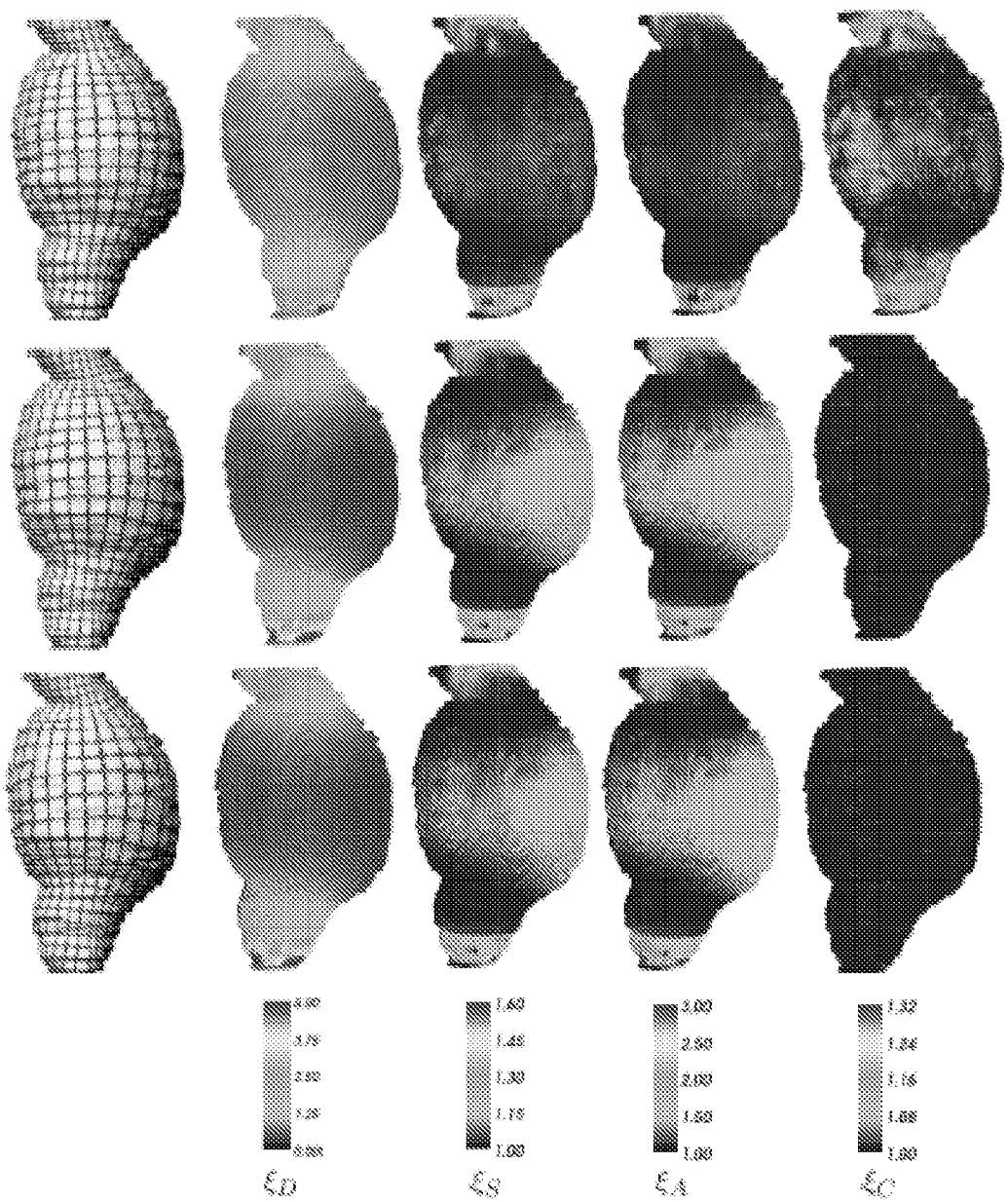
FIG. 16: A visualization of the parameterization of a thrombus surface and the contribution of the triangles to the different distortion measures.
Figure 17:
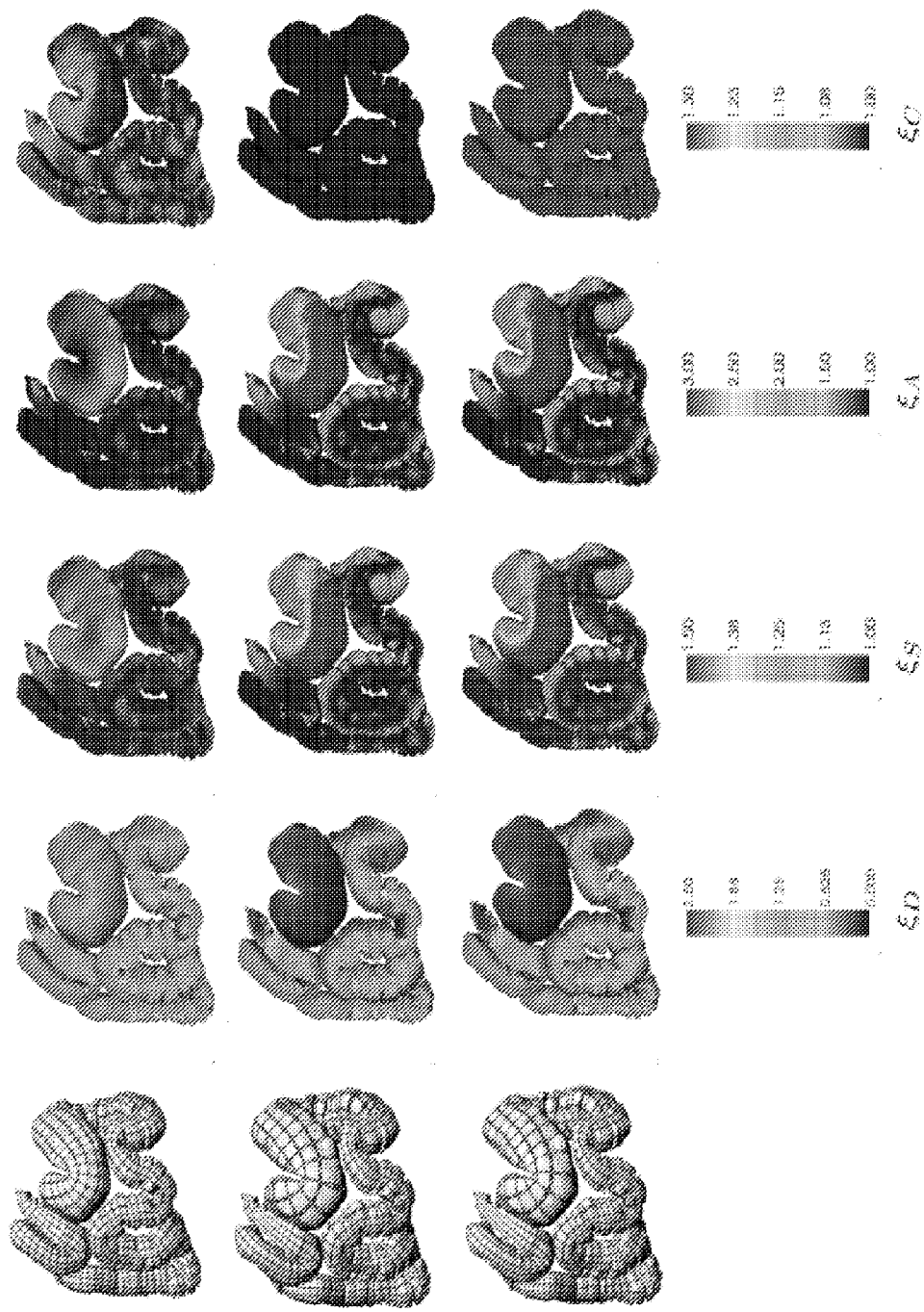
FIG. 17: A visualization of the parameterization of a colon surface and the contribution of the triangles to the different distortion measures.

From FIG. 13, a number of observations can be made. On one hand, the linear methods, in comparison with the non-linear method, generate parameterizations with less angle distortion and lower Dirichlet energy. The lowest stretch and area distortions, on the other hand, are always obtained by the non-linear parameterization method. This is because the methods generate parameterizations by optimizing these respective measures. It can also be observed that the non-linear method generates parameterizations which are more balanced, in terms of area and angle distortions, compared to the linear methods. This is particularly true for surfaces with large variations in cross-sectional diameter, e.g. the thrombus data sets and the colon data sets. FIG. 16 illustrates from top to bottom: a parameterization generated by the non-linear method, the linear method, and Haker's method. From left to right: a visualization of the parameterization through iso-parametric lines, followed by the visualisation of the per triangle contribution of the distortion measures $\xi_D$, $\xi_S$, $\xi_A$ and $\xi_C$. The thrombus surface has a large variation in cross-sectional diameter, as a consequence, the linear parameterization methods suffer from significant area distortions over the whole of the surface. FIG. 16: In case of the colon, the area distortions were too large to visualize in the graph for the linear methods. These large distortions in area can be observed in FIG. 17. Note that the area distortions are much smaller with the non-linear method. This is important if the parameterization is employed for virtual colon flattening because large area distortions can result in down-sizing of important features that should not missed during inspection. For surfaces of more or less constant circumference, both the linear and non-linear methods generate parameterizations with low distortion. FIG. 17 illustrates from top to bottom: a parameterization generated by the non-linear method, the linear method, and Haker's method. From left to right: a visualization of the parameterization through isoparametric lines, followed by the visualisation of the per triangle contribution of the distortion measures $\xi_D$, $\xi_S$, $\xi_A$ and $\xi_C$.

In FIG. 15, a visual comparison is made of the parameterizations of a trachea generated by the different methods, i.e. from top to bottom: parameterization generated by the non-linear method, the linear method, and Haker's method. From left to right: a visualization of the parameterization through iso-parametric lines, followed by the visualisation of the per triangle contribution of the distortion measures $\xi_D$, $\xi_S$, $\xi_A$ and $\xi_C$. The surface has approximately constant cross-sectional diameter (except for the lowest part, where the trachea bifurcates), as a result all methods generate acceptable parameterizations.

For conformal harmonic parameterizations, as generated by the linear methods, the Dirichlet energy $\xi_D$ should be approximately 1. For most surfaces, this is the case for both the linear method of the present invention and the method of Haker. However, for some surfaces an increased energy was observed, particularly with Haker's method. The increased energy is caused by poor estimation of the length of the parameterization domain. The length is estimated by enforcing the conformality condition at the boundary. The method of Haker uses the boundary triangles for the conformality condition whereas the linear method of the present invention uses all triangles neighbouring a boundary vertex for the conformality condition. This difference explains the poor estimation of the length for some surfaces with Haker's method. Note that, as with the linear method of the present invention, the method of Hong et al. (2006) normally should not suffer from this problem.

From FIG. 14, it can be seen that the non-linear method is an order of magnitude slower compared to the linear methods. However, parameterizations with more balanced distortions are obtained in return. It can also be seen that the linear method of the present invention is slightly slower than Haker's method. This is due to the slow calculation of the surface path, connecting both boundaries, which is based on slow geodesic distance computations. This, however, could be replaced by a much faster path calculation, e.g. Dijkstra's shortest path algorithm, without any influence on the resulting parameterizations. The linear system of the method of the present invention is larger compared to Haker's system, therefore, also more time is spent in solving that system.

It is noted that both the linear conformal parameterization technique and the non-linear stretch based parameterization technique, proposed in the present invention, are useful in their own right. The choice as to whether use the linear method or non-linear method depends on the targeted application. For example, the conformal parameterization can be employed to translate a surface based PDE into a modified 2D PDE which is much easier to solve (Lui et al., Solving PDEs on Manifolds with Global Conformal Parameterisation, 307-319, 2005). In this case, the introduced area distortions do not influence the result. In other applications, where area distortions are to be kept to a minimum, e.g. statistical shape modelling, one should use the non-linear method. An exception can be made, and one can use the conformal method, for surfaces which are well behaved and thus can be conformally mapped to the cylinder without large area distortions. The trachea data sets, used in the present invention, are a good example of such a case.

All of the above methods can be implemented on the GPU and in that way enjoy massive parallellism. Sparse linear system solvers and multi-grid solvers are readily available from Bolz et al. (ACM Trans. Graph. 22(3) (2003) 917-924). The non-linear minimization of the vertices within their respective 1-rings can also be solved in parallel by conjugate gradient on the GPU.

A person skilled in the art will understand that the examples described above are merely illustrative in accordance with the present invention and not limiting the intended scope of the invention. Other applications of the present invention may also be considered.

The invention claimed is:

1. A method for parameterizing a tubular surface onto a cylinder, the method being implemented by one or more processors and comprising:
   building a progressive mesh from said tubular surface;
   mapping said mesh onto said cylinder of a given length, thereby obtaining a parameterisation with an initial distortion represented by a distortion measure; and
   gradually refining said parameterisation,
   wherein gradually refining said parameterisation includes
      iteratively introducing additional vertices to said cylinder by splitting vertices on said mesh,
      optimizing a position of each the additional vertices with respect to said distortion measure, and
      automatically optimizing said length of the cylinder by modifying said length of the cylinder such that said initial distortion is reduced.

2. The method of claim 1, wherein said distortion comprises both angle and area distortion.

3. The method of claim 2, wherein said distortion measure balances said angle and area distortion.

4. The method of claim 1, wherein said progressive mesh is built by successively collapsing edges of said mesh into vertices, using a measure penalizing deviation from said tubular surface.

5. The method of claim 4, wherein an edge collapse is subject to at least the following constraints: an edge collapse should not result in:
   a) a non-manifold geometry;
   b) degenerate triangles;
   c) triangles that have all three vertices at the same boundary; and
   d) boundary vertices should only be collapsed into vertices of the same boundary.

6. The method of claim 1, wherein said mesh is mapped onto said cylinder when said mesh contains six vertices.

7. The method of claim 1, wherein said mapping is performed by evenly distributing said vertices of said mesh over the boundaries of the cylinder.

8. The method of claim 1, wherein occasionally a full optimization is run wherein vertices of said mesh are optimized, one by one, within the kernel of their 1-ring neighbourhood, until the improvement in distortion drops below a predefined value.

9. The method of claim 1, further comprising at least one linear parameterization step.

10. The method of claim 1, further comprising the step of flattening said cylinder onto a rectangle by cutting said cylinder open.

11. The method of claim 1, wherein said tubular surface is a colon.

12. The method of claim 1, wherein automatically optimizing said length of the cylinder includes a step of calculating a total distortion of the parameterisation and modifying said length in such a way as to decrease the total distortion, and
   repeating the step of calculating the total distortion and altering said length until substantial convergence.

13. A method for parameterizing a tubular surface onto a cylinder, the method being implemented by one or more processors and comprising the steps of:
   determining a path between two boundaries of the tubular surface;
   providing a map between said tubular surface and said cylinder of a given length using said path, said map being constructed as a harmonic function;
   enforcing conformality at the boundaries of said tubular surface; and
   automatically optimizing the length of the cylinder by adapting the length of the cylinder such that distortion introduced by the parameterisation is reduced.

14. A method for parameterizing a tubular surface onto a cylinder, the method comprising the steps of:
   a) parameterizing using a linear parameterisation step as in the method of claim 13;
   b) calculating the best position of each vertex within its 1-ring by a non-linear optimalisation of the balanced distortion measure comprising a gradual refinement of the parameterisation, iteratively introducing additional vertices to said cylinder by splitting vertices on said mesh with a position, optimizing said position of each of the additional vertices with respect to a distortion measure, and automatically optimizing said length of the cylinder by modifying said length of the cylinder such that an initial distortion is reduced;
   c) solving a linear problem using the resulting local optimal positions in a matrix, minimizing the energy needed to position said vertices within their 1-ring as determined in step b; and
   d) repeating the steps b) and c) until a stop criterion is met.

15. The method of claim 13, further comprising the step of flattening said cylinder onto a rectangle by cutting said cylinder open.

16. The method of claim 13, wherein said tubular surface is a colon.

17. A computer readable storage device containing instructions executable by a microprocessor for parameterizing a tubular surface onto a cylinder, comprising instructions for:
- building a progressive mesh from the tubular surface;
- mapping the mesh onto the cylinder over a given length to obtain a parameterisation with an initial distortion;
- refining the parameterisation by iteratively introducing additional vertices to the cylinder by splitting vertices on the mesh and positioning the additional vertices based on the distortion; and
- automatically optimizing the given length of the cylinder during positioning of the additional vertices by modifying the given length of the cylinder such that the initial distortion is reduced.

18. The computer readable storage device of claim 17, wherein the distortion comprises both angle and area distortion.

19. The computer readable storage device of claim 18, wherein the distortion is determined by balancing the angle and area distortion.

20. The computer readable storage device of claim 17, wherein the progressive mesh is built by successively collapsing edges of the progressive mesh into vertices using a measure penalizing deviation from the tubular surface.

21. The computer readable storage device of claim 17, wherein the progressive mesh is mapped onto the cylinder when the mesh contains a predetermined number of vertices.

22. The computer readable storage device of claim 21, wherein the progressive mesh is modified, node by node, within a kernel of a 1-ring neighbourhood surrounding each node, until the distortion is below a predefined value.

23. The computer readable storage device of claim 17, further comprising instructions for performing at least one linear parameterization step.

* * * * *